United States Patent
Makino

(10) Patent No.: US 12,499,545 B2
(45) Date of Patent: Dec. 16, 2025

(54) ENDOSCOPE PROCESSOR AND ENDOSCOPE SYSTEM

(71) Applicant: HOYA CORPORATION, Tokyo (JP)

(72) Inventor: Takao Makino, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 618 days.

(21) Appl. No.: 17/912,725

(22) PCT Filed: Sep. 1, 2021

(86) PCT No.: PCT/JP2021/032170
§ 371 (c)(1),
(2) Date: Sep. 19, 2022

(87) PCT Pub. No.: WO2022/064987
PCT Pub. Date: Mar. 31, 2022

(65) Prior Publication Data
US 2023/0142219 A1     May 11, 2023

(30) Foreign Application Priority Data

Sep. 25, 2020  (JP) .................................. 2020-160703
Sep. 28, 2020  (JP) .................................. 2020-161900

(51) Int. Cl.
*G06T 7/00*     (2017.01)
*A61B 1/00*     (2006.01)
(Continued)

(52) U.S. Cl.
CPC ...... *G06T 7/0016* (2013.01); *A61B 1/000094* (2022.02); *A61B 5/1032* (2013.01);
(Continued)

(58) Field of Classification Search
CPC .......... G06T 7/0016; G06T 7/74; G06T 7/90; G06T 2207/10024; G06T 2207/10068;
(Continued)

(56) References Cited

U.S. PATENT DOCUMENTS

2009/0092364 A1    4/2009  Johnston et al.
2010/0076921 A1*   3/2010  Kato .................. G06T 7/11
                                          706/54
(Continued)

FOREIGN PATENT DOCUMENTS

CN    109310301         2/2019
WO    2019142689        7/2019
(Continued)

OTHER PUBLICATIONS

May 1, 2025 Chinese Office Action in corresponding Chinese Application No. 202180017682.5 and English translation thereof.
(Continued)

*Primary Examiner* — Vu Le
*Assistant Examiner* — Rachel Anne Ometz
(74) *Attorney, Agent, or Firm* — GREENBLUM & BERNSTEIN, P.L.C.

(57) ABSTRACT

A processor for an endoscope includes an image processing unit that obtains a severity of a lesion in which a degree of progression is represented by one value, wherein the image processing unit includes a feature amount calculation unit configured to calculate a first pixel evaluation value indicating a degree of a first feature of appearance appearing in a lesion part, a representative value calculation unit configured to calculate a first representative evaluation value by integrating the first pixel evaluation values, and an integration unit configured to adjust an influence degree of the first representative evaluation value indicating a change in the severity with respect to a change in the first representative evaluation value based on information on a color component of an image, and calculate the severity of the lesion based on at least the first representative evaluation value by using the adjusted influence degree.

10 Claims, 16 Drawing Sheets

(51) Int. Cl.
    *A61B 5/00*     (2006.01)
    *A61B 5/103*     (2006.01)
    *G06T 7/73*     (2017.01)
    *G06T 7/90*     (2017.01)
    *G16H 30/20*     (2018.01)

(52) U.S. Cl.
    CPC .............. *A61B 5/4842* (2013.01); *G06T 7/74* (2017.01); *G06T 7/90* (2017.01); *G06T 2207/10024* (2013.01); *G06T 2207/10068* (2013.01); *G06T 2207/30028* (2013.01); *G06T 2207/30096* (2013.01); *G06T 2207/30101* (2013.01); *G16H 30/20* (2018.01)

(58) Field of Classification Search
    CPC . G06T 2207/30028; G06T 2207/30096; G06T 2207/30101; G06T 2207/30092; G06T 7/0014; A61B 1/000094; A61B 5/1032; A61B 5/4842; A61B 1/0638; G16H 30/20; G16H 30/40; G16H 50/30; G16H 50/50
    See application file for complete search history.

(56) References Cited

U.S. PATENT DOCUMENTS

| | | | |
|---|---|---|---|
| 2017/0112353 A1* | 4/2017 | Ikemoto | .............. A61B 5/1032 |
| 2018/0128681 A1 | 5/2018 | Otsuka | |
| 2018/0279866 A1 | 10/2018 | Makino | |
| 2019/0192048 A1 | 6/2019 | Makino et al. | |
| 2020/0126224 A1* | 4/2020 | Kamiyama | ............. A61B 1/045 |
| 2020/0305698 A1* | 10/2020 | Oosake | ............ A61B 1/000096 |
| 2021/0133974 A1 | 5/2021 | Makino | |
| 2021/0225517 A1* | 7/2021 | Baloglu | ................. G16H 20/40 |
| 2021/0256701 A1* | 8/2021 | Nozaki | .................. G16H 50/30 |
| 2021/0259515 A1 | 8/2021 | Makino | |
| 2021/0266434 A1 | 8/2021 | Makino | |
| 2021/0279498 A1 | 9/2021 | Makino | |
| 2021/0321856 A1 | 10/2021 | Koizumi et al. | |

FOREIGN PATENT DOCUMENTS

| | | | | |
|---|---|---|---|---|
| WO | WO-2019159435 A1 * | 8/2019 | | |
| WO | WO-2019159770 A1 * | 8/2019 | ....... | A61B 1/000094 |
| WO | 2020/066670 A1 | 4/2020 | | |
| WO | 2020/066807 A1 | 4/2020 | | |
| WO | 2020/188825 A1 | 9/2020 | | |
| WO | 2020/189213 A1 | 9/2020 | | |

OTHER PUBLICATIONS

International Search Report issued in International Bureau of WIPO Patent Application No. PCT/JP2021/032170, dated Nov. 22, 2021, along with an English translation thereof.

Feb. 10, 2025 Extended European Search Report issued in corresponding European Application No. 21872118.1.

* cited by examiner

IMAGE OF BIOLOGICAL TISSUE

COLOR MAP IMAGE

FIG. 8

|  |  |  | TP1 | |
|---|---|---|---|---|
| $-\frac{1}{20}$ | $-\frac{1}{20}$ | $\frac{1}{5}$ | $-\frac{1}{20}$ | $-\frac{1}{20}$ |
| $-\frac{1}{20}$ | $-\frac{1}{20}$ | $\frac{1}{5}$ | $-\frac{1}{20}$ | $-\frac{1}{20}$ |
| $-\frac{1}{20}$ | $-\frac{1}{20}$ | $\frac{1}{5}$ | $-\frac{1}{20}$ | $-\frac{1}{20}$ |
| $-\frac{1}{20}$ | $-\frac{1}{20}$ | $\frac{1}{5}$ | $-\frac{1}{20}$ | $-\frac{1}{20}$ |
| $-\frac{1}{20}$ | $-\frac{1}{20}$ | $\frac{1}{5}$ | $-\frac{1}{20}$ | $-\frac{1}{20}$ |

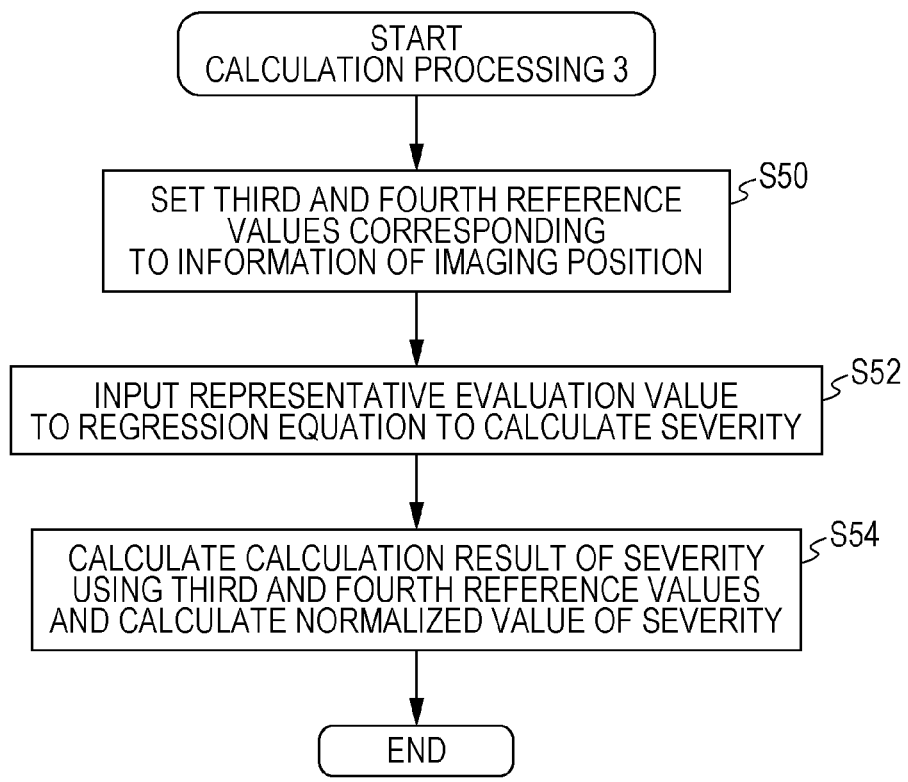

ENDOSCOPE PROCESSOR AND ENDOSCOPE SYSTEM

TECHNICAL FIELD

The present invention relates to a processor for an endoscope and an endoscope system that perform image processing on an image of a biological tissue in a body cavity.

BACKGROUND ART

A lesion part in a biological tissue has various levels of severity from inflammation in which a mucosal layer of the biological tissue becomes thin and rough and exhibits red to an ulcer partially missing to the mucosal layer and a lower layer thereof. For example, an ulcerated part of a lesion of ulcerative colitis contains white moss or pus-like mucus and becomes white, and an inflamed part has a red color including an edged part and an easily bleeding part. The lesion part can be imaged and observed by an endoscope system.

However, in order for an operator to be able to distinguish between a healthy part and the lesion part by the difference in color included in an image of an endoscope, it is necessary to receive long-term training under the instruction of a skilled person. In addition, even a skilled operator is not easy to identify the lesion part from a slight color difference, and careful work is required. Therefore, it is preferable that an endoscope system provide an evaluation result obtained by objectively quantifying a degree of progression of a lesion at the lesion part.

Meanwhile, an endoscope system capable of accurately evaluating a degree of progression of a lesion in a lesion part of a biological tissue is known (WO 2019/159770 A).

SUMMARY OF INVENTION

Technical Problem

The endoscope system includes an image processing unit that obtains severity of a lesion obtained by quantifying a degree of progression of a lesion of a biological tissue from an image of the biological tissue obtained by imaging the biological tissue in a body cavity. The image processing unit includes a feature amount calculation unit, a representative value calculation unit, and an integration unit.

The feature amount calculation unit calculates, for each pixel, a plurality of pixel evaluation values corresponding to the plurality of appearance features, each of the plurality of appearance features being distinguishable from a feature of a healthy part of biological tissue by a color component or a shape indicated by a lesion, the plurality of pixel evaluation values indicating a degree of each of the plurality of features regarding the color component or the color component and the shape indicated by the lesion part.

The representative value calculation unit integrates each of the calculated pixel evaluation values for each of the plurality of features to calculate a representative evaluation value corresponding to each of the plurality of features of the imaged biological tissue.

The integration unit calculates at least two representative evaluation values among the calculated representative evaluation values, and calculates one integrated numerical value as the severity of the lesion.

As a result, it is possible to accurately evaluate the degree of progression of the lesion at the lesion part of the biological tissue.

The calculation using at least two representative evaluation values performed by the integration unit of the endoscope system is processing of adding or subtracting a product obtained by multiplying at least two representative evaluation values by a weighting coefficient, and in the calculation, a type of calculation is changed depending on whether or not a specific representative evaluation value exceeds a predetermined threshold. However, in a case where the type of calculation is changed depending on whether or not the specific representative evaluation value exceeds the predetermined threshold, when the type of a target lesion changes, the threshold changes. Therefore, it is not preferable to variously align the threshold according to the type of lesion since the system becomes complicated. In addition, in a case where the representative evaluation value fluctuates around the threshold, the severity as the calculation result is also likely to fluctuate unstably and greatly. For this reason, it is preferable to accurately evaluate the degree of progression of the lesion at the lesion part without using parameters such as the above-described threshold used conventionally.

In addition, in order to stably and accurately evaluate the degree of progression of a lesion in a lesion part of a biological tissue as compared with the related art, it is preferable that the representative evaluation value obtained by combining the pixel evaluation values of the respective pixels into one can be stably and appropriately represented.

In addition, in a case where the endoscope is inserted into a long tubular organ such as a large intestine, a color of a mucous membrane and an appearance of a blood vessel are different between an entrance side portion into which the endoscope is inserted and a back side portion in a depth direction, and the representative evaluation value to be calculated is different even in the same healthy part. Therefore, the representative evaluation values are different from each other between the entrance side portion and the back side portion in the depth direction even when the lesion progresses to the same extent. In this manner, the representative evaluation value changes depending on an imaging position even in the same degree of lesion progression. In addition, in a case where the severity is calculated using a calculation formula from the representative evaluation value at each imaging position in the depth direction of a long organ, when the severity is calculated using the same calculation formula regardless of the imaging position, even in an actually healthy organ, the value of the severity may increase depending on the imaging position due to a change in the representative evaluation value. In this case, it is easy to make an erroneous determination that the lesion part is present in a portion where the value of the severity is large. As described above, there is a problem that the calculated representative evaluation value or the value of the severity changes depending on the imaging position, thereby deviating from the evaluation result of the actual progression degree of the lesion. The actual evaluation result of the degree of progression of the lesion is, for example, a subjective evaluation result (for example, MAYO endoscopic subscore) by a doctor or a histological evaluation result.

Therefore, an object of the present invention is to provide a processor for an endoscope and an endoscope system capable of accurately evaluating a degree of progression of a lesion at a lesion part of a biological tissue as compared with the related art.

Solution to Problem

One embodiment of the present invention is a processor for an endoscope. The processor for an endoscope includes an image processing unit configured to obtain a severity of a lesion representing a degree of progression of a lesion of a biological tissue by one value from an image of a lesion part of the biological tissue obtained by an electronic endoscope configured to image the biological tissue in a body cavity, using at least information on the image.

The image processing unit includes
a feature amount calculation unit configured to calculate, for each pixel from the image, a first pixel evaluation value indicating a degree of a first feature regarding a first color component indicated by the lesion part or a shape of the lesion part, the first pixel evaluation value being a pixel evaluation value corresponding to the first feature being capable of distinguishing the first feature of appearance appearing in the lesion part from a feature of a healthy part of the biological tissue by the first color component or the shape of the lesion part,
a representative value calculation unit configured to calculate a first representative evaluation value of the first feature of the biological tissue by collecting the first pixel evaluation values of the respective pixels in the image, and
an integration unit configured to calculate severity of the lesion based on at least the first representative evaluation value by adjusting an influence degree of the first representative evaluation value indicating a change in the severity with respect to a change in the first representative evaluation value based on information on a second color component of the image different from the first color component or based on a second representative evaluation value obtained by collecting second pixel evaluation values indicating a degree of another second feature different from the first feature.

Preferably, the severity is calculated according to a polynomial having at least the first representative evaluation value as an explanatory variable, and
the influence degree is a coefficient related to the first representative evaluation value of the polynomial.

Preferably, the polynomial is a regression equation regarding the severity obtained by performing multiple regression analysis in advance using a reference image in which an evaluation value is determined as an evaluation result regarding a degree of progression of the lesion, using the first pixel evaluation value and a value indicating information on the second color component or the second pixel evaluation value as explanatory variables, using the evaluation value in the reference image as a value of the severity, and using the value of the severity as an objective variable.

Preferably, when the first representative evaluation value is X and the second representative evaluation value is Y, the integration unit performs calculation according to the severity=$\alpha_1 \cdot X + \beta_1 \cdot Y + \gamma_1 \cdot X \cdot Y + d_1$ using coefficients $\alpha_1$, $\beta_1$, and $\gamma_1$ and a constant $d_1$.

Preferably, when the first representative evaluation value is X and a value indicating information on the second color component is Z, the integration unit performs calculation according to the severity=$\alpha_2 \cdot X + \beta_2 \cdot X \cdot Z + d_2$ using coefficients $\alpha_2$ and $\beta_2$ and a constant $d_2$.

Preferably, the influence degree of the first representative evaluation value is adjusted using at least a third representative evaluation value obtained by collecting third pixel evaluation values indicating a degree of another third feature different from the first feature and the second feature in addition to the second representative evaluation value or the information on the second color component.

Preferably, each of the first feature and the second feature is any one of a degree of a color component exhibited by an inflamed part of the biological tissue, a degree of a color component exhibited by a blood vessel region indicating a blood vessel extending in a streak shape in the biological tissue, and a degree of a color component exhibited by an ulcerated part of the biological tissue.

Preferably, the first representative evaluation value is a total number of bins having a frequency of 1 or more in a histogram of the first pixel evaluation value in the image of the lesion part of the biological tissue.

Preferably, the first representative evaluation value is a value indicating a degree of a color component exhibited by an inflamed part of the biological tissue.

Preferably, the information on the second color component is a feature amount related to a color component exhibited by a residue that is introduced into the body cavity from the outside and is on the biological tissue.

Another aspect of the present invention is a processor for an endoscope. The processor for an endoscope includes an image processing unit configured to obtain a value of severity of a lesion representing a degree of progression of a lesion of a biological tissue by one value from an image of a lesion part of the biological tissue obtained by an electronic endoscope by using at least information on the image.

The image processing unit includes
a feature amount calculation unit configured to calculate, from the image, a pixel evaluation value indicating, for each pixel, a degree of each of a plurality of appearance features appearing in the lesion part regarding a color component indicated by the lesion part or a shape of the lesion part, the pixel evaluation value being an evaluation value corresponding to each of the plurality of appearance features capable of distinguishing the plurality of appearance features from a feature of a healthy part of the biological tissue by the color component or the shape of the lesion part,
a representative value calculation unit configured to calculate one representative evaluation value of each of the plurality of features of the biological tissue for one image by collecting the pixel evaluation values of the respective pixels in the image,
an imaging position information processing unit configured to associate information on an imaging position in the body cavity when the image is captured with the image, and
an integration unit configured to calculate a value of severity of the lesion based on the representative evaluation value of each of the plurality of features for an evaluation target image captured by the electronic endoscope, and set calculation processing of the severity adjusted according to the information on the imaging position corresponding to the evaluation target image when calculating the value of the severity.

Preferably, the integration unit calculates a value of the severity according to a relational expression associating the severity with the representative evaluation value of each of the plurality of features, and
in the relational expression, a value according to the information on the imaging position is set as a coefficient related to the representative evaluation value.

The processor for an endoscope further includes a storage unit configured to hold, for each imaging position of the electronic endoscope, two reference values related to the representative evaluation value set based on a plurality of reference images obtained by imaging a plurality of lesion parts having different degrees of lesion progression by the electronic endoscope, as values determined according to the information on the imaging position of the reference image.

In this case, preferably, the integration unit calculates a value of the severity using a relational expression in which a normalized evaluation value obtained by normalizing the representative evaluation value of the reference image with the two reference values according to the information on the imaging position of the reference image captured by the electronic endoscope and the severity are associated in advance, and the value of the severity is calculated by inputting the normalized evaluation value obtained by normalizing the representative evaluation value of the evaluation target image with the two reference values determined according to the information on the imaging position of the evaluation target image into the relational expression.

The processor for an endoscope further includes a storage unit configured to hold, for each imaging position of the electronic endoscope, two reference values regarding the severity set based on a plurality of reference images obtained by imaging a plurality of lesion parts having different degrees of lesion progression by the electronic endoscope, as values determined according to the imaging position of the reference image. In this case, preferably, the integration unit calculates the severity using a relational expression in which the representative evaluation value of the evaluation target image and the severity are associated in advance, and calculates, as the value of the severity, a normalized value obtained by normalizing a value of a calculation result with the two reference values determined corresponding to information on the imaging position of the evaluation target image.

Preferably, the relational expression is a regression equation of a polynomial extracted by performing multiple regression analysis such that a value of the severity calculated from the representative evaluation value of each of the plurality of features corresponds to the evaluation result of the reference image in which the evaluation result of the degree of progression of the lesion prepared in advance is determined.

Preferably, the information on the imaging position is position information on one section when a region in a depth direction of a tubular organ is divided into a plurality of sections.

Another aspect of the present invention is an endoscope system including an electronic endoscope configured to image biological tissue in a body cavity and a processor for an endoscope, the processor being connected to the electronic endoscope.

Advantageous Effects of Invention

According to the above-described endoscope system, it is possible to evaluate a degree of progression of a lesion at a lesion part of a biological tissue with higher accuracy compared to the related art.

According to the processor for an endoscope and the endoscope system described above, when the degree of progression of the lesion is to be evaluated, the degree of progression of the lesion can be stably and accurately evaluated regardless of an imaging position of an evaluation target image.

BRIEF DESCRIPTION OF DRAWINGS

FIG. 8 is a diagram illustrating an example of a filter coefficient in a case where a template used in the processor for an endoscope according to one embodiment is used as a spatial filter.

FIG. 15C is a diagram illustrating an example of a flow of the method of calculating the severity performed by the processor for an endoscope according to one embodiment.

DESCRIPTION OF EMBODIMENTS

Figure 1:
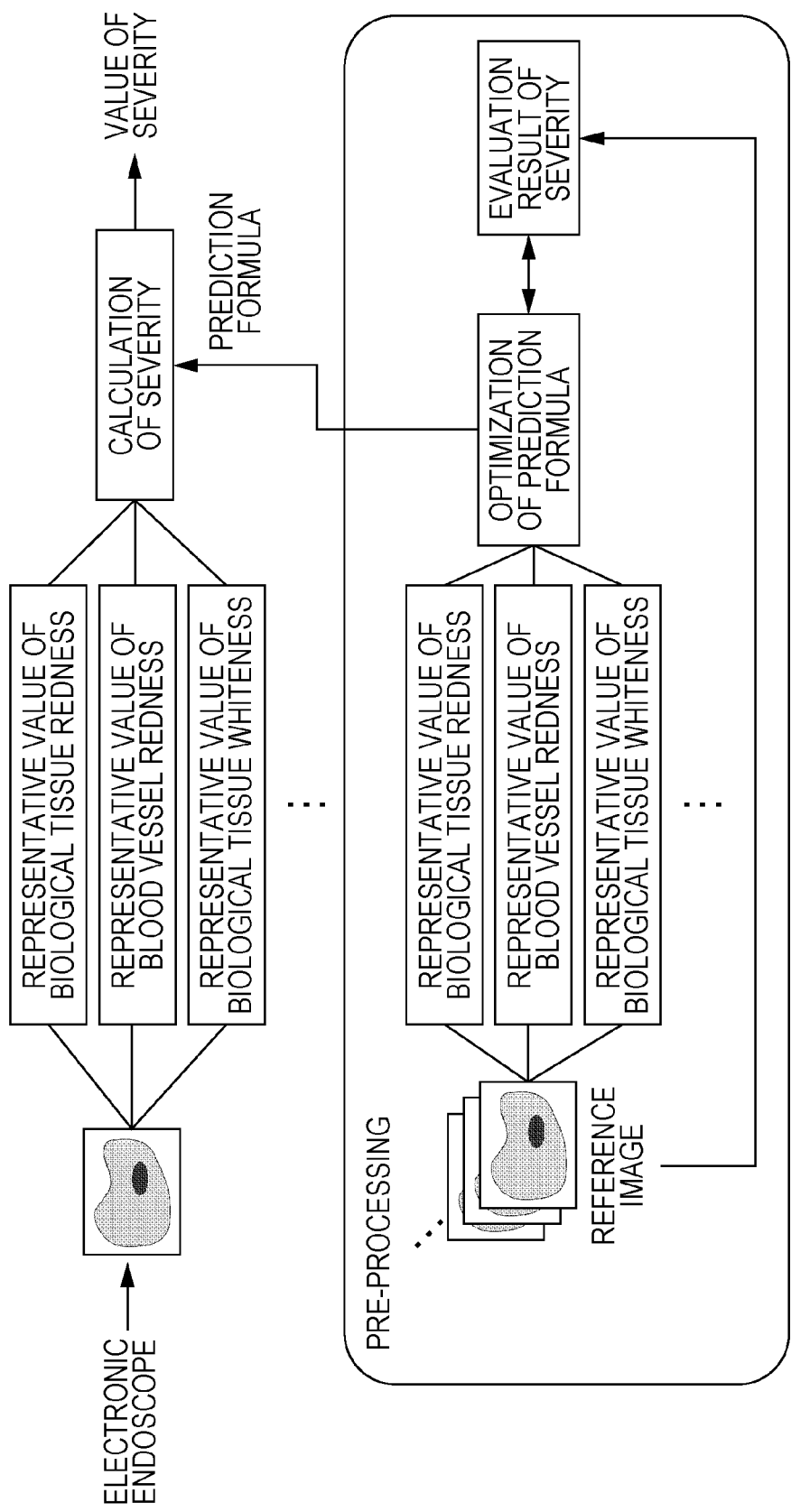
FIG. 1 is a diagram illustrating an example of processing performed by an endoscope system according to one embodiment.

Hereinafter, before describing a processor for an endoscope and an endoscope system according to an embodiment of the present invention with reference to the drawings, first, a concept of an endoscope system according to one embodiment will be described.

(Calculation of Severity in Endoscope System)

A lesion part in a biological tissue varies from inflammation to ulcer depending on a degree of progression of a lesion. For example, a conventional endoscope system calculates, for each pixel, a plurality of pixel evaluation values corresponding to a plurality of appearance features that can distinguish each of a plurality of appearance features appearing in a lesion part from a feature of a healthy part of a biological tissue by a color component indicated by the lesion part or a shape of the lesion, from an image of the biological tissue. Furthermore, the conventional endoscope system calculates a plurality of representative evaluation values by integrating the calculated pixel evaluation values of the respective pixels for each of the plurality of appearance features, and calculates at least two representative evaluation values among the plurality of calculated representative evaluation values to integrate one numerical value as the value of the severity of the lesion. The above calculation is performed in accordance with a formula representing a relationship between severity and a plurality of representative evaluation values in advance. However, in this formula, since the influence degree of a certain representative evaluation value on the severity, that is, a change in the severity with respect to a change in the representative evaluation value is constant, there is a deviation from the evaluation result of an actual degree of progression of the lesion in some cases. In addition, in order to change the influence degree of the representative evaluation value on the severity, conventionally, the calculation formula for calculating the severity may be changed according to the level of one threshold of the representative evaluation value.

Meanwhile, in an endoscope system according to one embodiment of the present invention, when calculating the severity of the lesion from a plurality of representative evaluation values, the severity of the lesion is calculated based on at least a first representative evaluation value by adjusting an influence degree of the first representative evaluation value which is one of the plurality of representative evaluation values. The influence degree is adjusted based on information on a second color component of an image different from a first color component of an image of interest at the time of calculating the first representative evaluation value, or based on at least a second representative evaluation value indicating a degree of another second feature different from the first feature. Note that the adjustment of the influence degree is not limited to being performed based on the second representative evaluation value, and may be performed based on a third representative evaluation value, a fourth representative evaluation value, or the like indicating a degree of a feature of another third, fourth, or the like different from the first feature and the second feature.

The appearance features include a degree of a particular color component indicated by the lesion part. For example, it is a degree of red exhibited by the inflamed part. In this case, a pixel evaluation value for each pixel obtained by quantifying the degree of this feature is, for example, biological tissue redness obtained by quantifying the degree of red. In addition, another appearance feature is a degree of a color component included in a portion having a specific shape in the imaged biological tissue. In this case, the pixel evaluation value for each pixel obtained by quantifying the degree of the feature is, for example, the blood vessel redness obtained by quantifying the degree of red included in a blood vessel region extending in a streak shape in the lesion part and the periphery thereof. Another appearance feature is also a particular color component exhibited by the ulcerated part, for example, a degree of white.

The appearance feature also includes a feature related to the shape, and may be, for example, a degree of a shape of surface irregularities of the lesion part or a degree of a predetermined shape such as surface molding.

FIG. 1 is a diagram illustrating an example of processing performed by an endoscope system according to one embodiment. In the example illustrated in FIG. 1, a plurality of representative evaluation values include at least a representative value of biological tissue redness indicating a degree of inflammation of a biological tissue, a representative value of blood vessel redness indicating a degree of red in a blood vessel region, and a representative value of biological tissue whiteness indicating a degree of ulcer. A method of calculating these representative evaluation values will be described later.

Meanwhile, as pre-processing, a plurality of reference images in which the evaluation result of the degree of progression (severity) of the lesion is determined in advance are prepared, and the plurality of representative evaluation values are calculated in advance in each of these reference images. A prediction formula is calculated using the plurality of representative evaluation values such that the severity predicted by combining the plurality of representative evaluation values including these three representative evaluation values most correlates with the evaluation result of the degree of progression (severity) of the lesion determined in each reference image and corresponds thereto. This prediction formula is extracted and set before the calculation of the severity in the endoscope system. Note that the evaluation result of the degree of progression (severity) of the lesion is, for example, a subjective evaluation result (for example, MAYO endoscopic subscore) by a doctor, a histological evaluation result, or a pathological diagnosis score (Geboes score, RHI (Reactive hyperemia index)). For example, RHI (reactive hyperemia index) is evaluated with a 34-point value of 0 to 33.

Next, a plurality of representative evaluation values including the representative value of the biological tissue redness, the representative value of the blood vessel redness, and the representative value of the biological tissue whiteness obtained from the image obtained by imaging the biological tissue with the electronic endoscope are calculated, and the severity is calculated from the plurality of calculated representative evaluation values using the prediction formula.

In this case, in the prediction formula, the influence degree on the severity of the first representative evaluation value, which is one of the plurality of representative evaluation values, is adjusted. The influence degree is adjusted based on information on a second color component of an image different from a first color component of an image of interest at the time of calculating the first representative evaluation value, or based on at least a second representative evaluation value indicating a degree of another second feature different from the first feature.

For example, the influence degree on the severity of the representative value of the biological tissue redness indicating the degree of inflammation is adjusted based on the representative value of the blood vessel redness. Alternatively, the influence degree of the representative value of the biological tissue redness is adjusted based on the information on a color component of blue. When the prediction formula is represented by a polynomial using at least the first representative evaluation value and the second representative evaluation value, the polynomial includes, for example, a term obtained by multiplying a product of the first representative evaluation value and the second representative evaluation value by a coefficient relating to the product in addition to a term obtained by multiplying the coefficient relating to each of the first representative evaluation value and the second representative evaluation value to perform addition and subtraction. Therefore, in this case, the influence degree of the first representative evaluation value on the severity includes at least the product of the coefficient relating to the product of the first representative evaluation value and the second representative evaluation value and the second representative evaluation value in addition to the coefficient obtained by multiplying the first representative evaluation value. Therefore, the influence degree of the first representative evaluation value on the severity is adjusted based on at least the second representative evaluation value.

The information on the second color component is, for example, a feature amount related to a color component exhibited by a residue which is introduced into the body cavity from the outside and is on the biological tissue.

As described above, since the influence degree of the first representative evaluation value on the severity is adjusted based on the information on the second color component or based on the second representative evaluation value indicating the degree of the second feature, the deviation from the actual degree of progression (severity) of the lesion can be reduced. As a result, it is possible to evaluate the degree of progression of the lesion at the lesion part of the biological tissue with higher accuracy than before.

Figure 2:
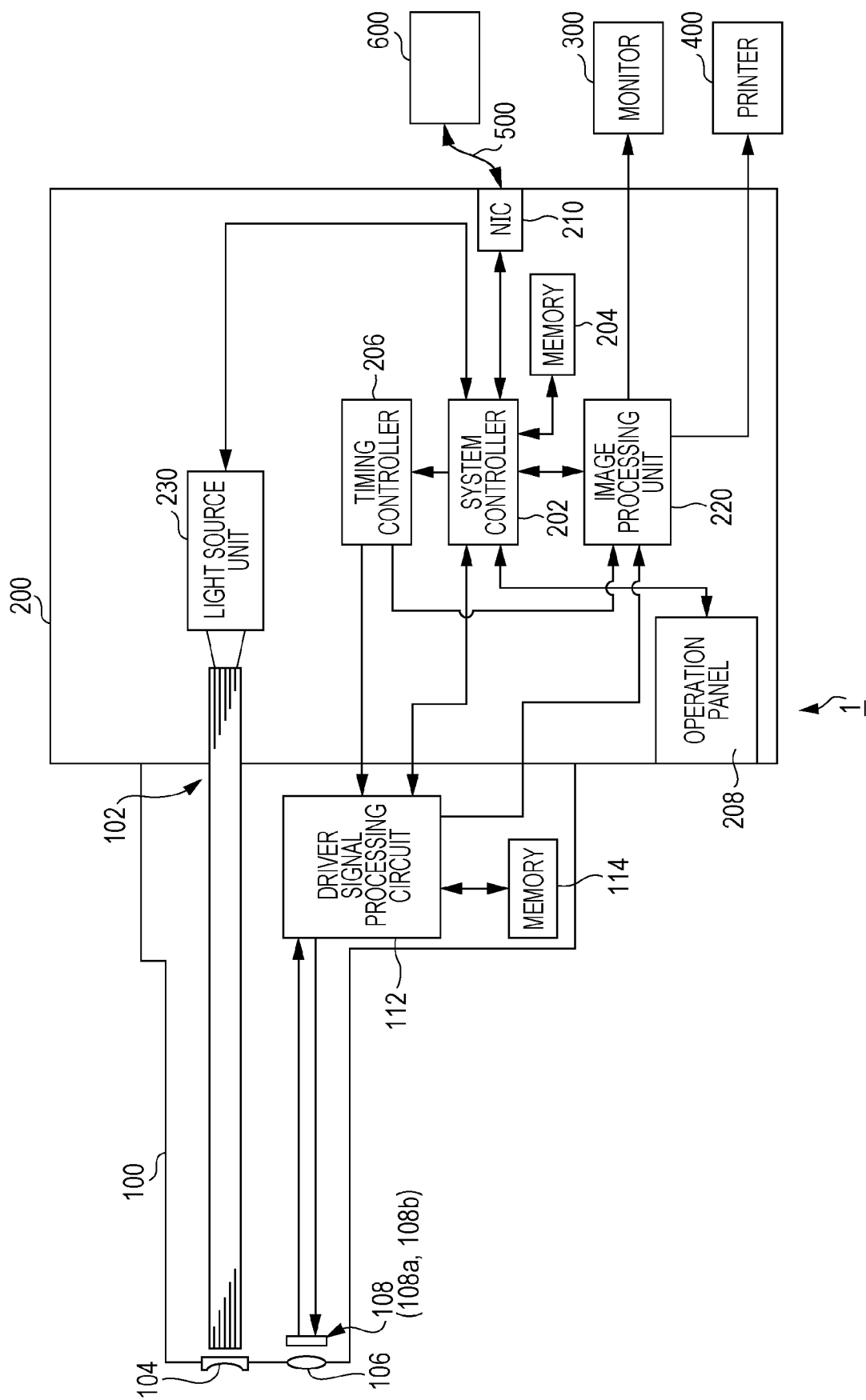
FIG. 2 is a block diagram illustrating a configuration of the endoscope system according to one embodiment.

FIG. 2 is a block diagram illustrating a configuration of the electronic endoscope system 1 according to one embodiment of the present invention. As illustrated in FIG. 2, the electronic endoscope system 1 includes an electronic endoscope 100, an electronic endoscope processor 200, a monitor 300, and a printer 400.

The electronic endoscope processor 200 includes a system controller 202 and a timing controller 206. The system controller 202 executes various programs stored in the memory 204 and integrally controls the entire electronic endoscope system 1. In addition, the system controller 202 changes various settings of the electronic endoscope system 1 according to an instruction from a user (operator or assistant) input to an operation panel 208. The timing controller 206 outputs a clock pulse for adjusting the timing of the operation of each unit to each circuit in the electronic endoscope system 1.

The electronic endoscope processor 200 includes a light source unit 230 that supplies illumination light to the electronic endoscope 100. Although not illustrated, the light source unit 230 includes, for example, a high luminance lamp that emits white illumination light by receiving supply of drive power from a lamp power supply, for example, a xenon lamp, a metal halide lamp, a mercury lamp, or a halogen lamp. The light source unit 230 is configured such that the illumination light emitted from the high luminance lamp is condensed by a condenser lens (not illustrated) and then enters an incident end of a Light Carrying Bundle (LCB) 102 which is a bundle of optical fibers of the electronic endoscope 100 via a dimming device (not illustrated).

Alternatively, the light source unit 230 includes a plurality of light emitting diodes that emits light in a wavelength band of a predetermined color. The light source unit 230 is configured such that light emitted from the light emitting diode is synthesized using an optical element such as a dichroic mirror, and the synthesized light is condensed as illumination light by a condenser lens (not illustrated) and then is incident on an incident end of a Light Carrying Bundle (LCB) 102 of the electronic endoscope 100. A laser diode may be used instead of the light emitting diode. The light emitting diode and the laser diode have features such as low power consumption and a small amount of heat generation as compared with other light sources, and thus have an advantage that a bright image can be acquired while suppressing the power consumption and the amount of heat generation. Since a bright image can be acquired, the accuracy of an evaluation value regarding a lesion to be described later can be improved.

Note that, in the example illustrated in FIG. 2, the light source unit 230 is provided to be built in the electronic endoscope processor 200, but may be provided in the electronic endoscope system 1 as a device separate from the electronic endoscope processor 200. Furthermore, the light source unit 230 may be provided at a distal end portion of the electronic endoscope 100 described later. In this case, an LCB 102 that guides the illumination light is unnecessary.

The illumination light emitted from the light source unit 230 is not limited to white light, and may be special light such as narrow band light having a predetermined narrow wavelength band as a wavelength band.

The illumination light incident into the LCB 102 from the incident end propagates in the LCB 102, is emitted from the exit end of the LCB 102 arranged in the distal end portion of the electronic endoscope 100, and is applied to an object via a light distribution lens 104. Reflected light from the object forms an optical image on a light receiving surface of a solid-state imaging element 108 via an objective lens 106.

The solid-state imaging element 108 is, for example, a single-chip color charge-coupled device (CCD) image sensor in which various filters of an infrared (IR) cut filter 108a and a Bayer array color filter 108b are arranged on a light receiving surface, and generates primary color signals of red (R), green (G), and blue (B) corresponding to an optical image formed on the light receiving surface. Instead of the single-chip color CCD image sensor, a single-chip color complementary metal oxide semiconductor (CMOS) image sensor can also be used. CMOS image sensors generally tend to have a darker overall image than CCD image sensors. Therefore, an advantageous effect that the variation in the severity of the lesion of the lesion part due to the brightness of the image can be suppressed in the numerical processing for evaluating the lesion to be described below is more remarkable in the case of using the CMOS image sensor. As described above, the electronic endoscope 100 images the biological tissue in the body cavity using the solid-state imaging element 108.

A driver signal processing circuit 112 is provided in a connection portion of the electronic endoscope 100. The driver signal processing circuit 112 performs predetermined signal processing such as color interpolation or matrix calculation on a primary color signal input from the solid-state imaging element 108 to generate an image signal (luminance signal Y, color difference signal Cb, Cr), and outputs the generated image signal to the image processing unit 220 of the electronic endoscope processor 200. In addition, the driver signal processing circuit 112 accesses the memory 114 and reads unique information on the electronic endoscope 100. The unique information on the electronic endoscope 100 recorded in the memory 114 includes, for example, the number of pixels and sensitivity of the solid-state imaging element 108, an operable frame rate, a model number, and the like. The driver signal processing circuit 112 outputs the unique information read from the memory 114 to the system controller 202.

The system controller 202 performs various calculations based on unique information on the electronic endoscope 100 and generates a control signal. The system controller 202 uses the generated control signal to control the operation and timing of each circuit in the electronic endoscope processor 200 such that processing suitable for the electronic endoscope 100 being connected to the electronic endoscope processor 200 is performed.

The timing controller 206 supplies a clock pulse to the driver signal processing circuit 112, the image processing unit 220, and the light source unit 230 according to timing control by the system controller 202. The driver signal processing circuit 112 drives and controls the solid-state imaging element 108 at a timing synchronized with the frame rate of the video processed on the electronic endoscope processor 200 side according to the clock pulse supplied from the timing controller 206.

Under the control of the system controller 202, the image processing unit 220 generates a video signal for monitor display of an endoscopic image or the like based on the image signal input from the driver signal processing circuit 112, and outputs the video signal to the monitor 300. Furthermore, the image processing unit 220 obtains the severity of the lesion obtained by quantifying the degree of progression of the lesion of the biological tissue using the color component and shape information on the image from the image of the lesion part of the biological tissue obtained by the electronic endoscope 100. In addition, the image processing unit 220 generates a color map image in which colors are replaced based on biological tissue redness, blood vessel redness, and the like obtained at the time of performing the numerical processing for obtaining the severity. The image processing unit 220 generates a video signal for displaying the severity information and the color map image on the monitor, and outputs the video signal to the monitor 300. As a result, the operator can receive the severity of the lesion of the biological tissue of interest through the image displayed on the display screen of the monitor 300. The image processing unit 220 outputs the color map image and the severity information to the printer 400 as necessary.

The electronic endoscope processor 200 is connected to a server 600 via a network interface card (NIC) 210 and a network 500. The electronic endoscope processor 200 can download information (for example, electronic medical record information on a patient and information on an operator) on the endoscopic examination from the server 600. The downloaded information is displayed on, for example, a display screen of the monitor 300 or the operation panel 208. In addition, the electronic endoscope processor 200 can save endoscopic examination results (endoscope image data, examination conditions, an image analysis result, an operator's opinion, and the like) in the server 600 by uploading the endoscopic examination results to the server 600.

Figure 3:
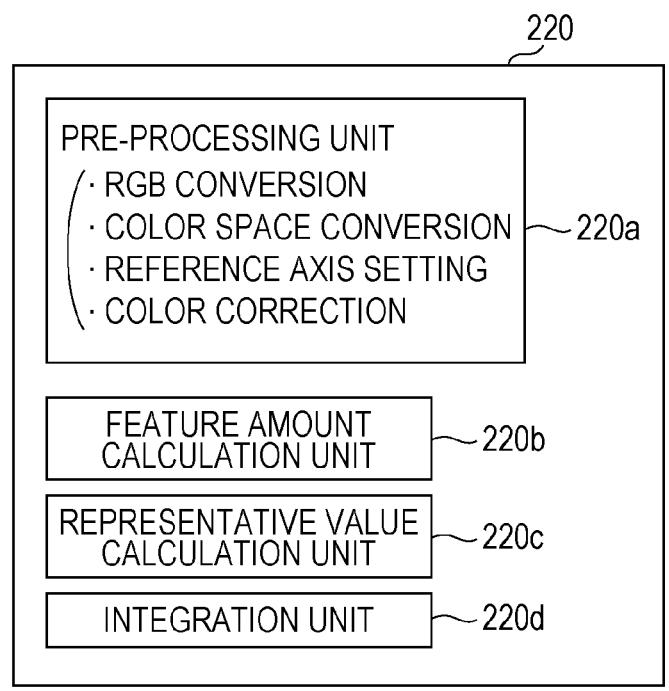
FIG. 3 is a diagram illustrating a configuration of an image processing unit that calculates severity in a processor for an endoscope according to one embodiment.

FIG. 3 is a diagram for describing a configuration of the image processing unit 220 that performs numerical processing of quantifying the degree of the feature of the lesion in order to calculate the severity of the lesion of the biological tissue.

The image processing unit 220 is a unit that obtains the severity of the lesion obtained by quantifying the degree of progression of the lesion of the biological tissue from the image of the biological tissue obtained by the electronic endoscope 100. The image processing unit 220 includes a preprocessing unit 220a, a feature amount calculation unit 220b, a representative value calculation unit 220c, and an integration unit 220d.

As one embodiment, the plurality of representative evaluation values are the first representative evaluation value and the second representative evaluation value, the feature amount calculation unit 220b calculates, as the first pixel evaluation value for calculating the first representative evaluation value, the biological tissue redness obtained by quantifying the degree of red of the biological tissue for each pixel, and calculates, as the second pixel evaluation value for calculating the second representative evaluation value, the blood vessel redness obtained by quantifying the red of the blood vessel region extending in a streak shape on the biological tissue. Hereinafter, a mode for calculating the biological tissue redness and the blood vessel redness will be described.

The preprocessing unit 220a is a unit for preprocessing an image for evaluating the degree of redness exhibited by a biological tissue. As illustrated as an example, the preprocessing unit 220a performs processing of RGB conversion, color space conversion, reference axis setting, and color correction.

The preprocessing unit 220a converts the image signal (luminance signal Y, color difference signals Cb and Cr) input from the driver signal processing circuit 112 into image color components (R, G, B) using predetermined matrix coefficients.

The preprocessing unit 220a further performs color space conversion in which the image data converted into the image color component is normally projected onto the RG plane. Specifically, the image color component of each pixel in the RGB color space defined by three RGB primary colors is converted into the image color component of RG. Conceptually, the image color component of each pixel in the RGB color space is plotted in the RG plane according to the pixel values of the R and G components (for example, a section in the RG plane taking the pixel value of the R component=0 to 255 and the pixel value of the G component=0 to 255). Hereinafter, for convenience of explanation, the point of the image color component of each pixel in the RGB color space and the point of the image color component plotted in the RG color space are referred to as a "pixel correspondence point". The RGB image color components of the RGB color space are, for example, color components having wavelengths of 620 to 750 nm, wavelengths of 495 to 570 nm, and wavelengths of 450 to 495 nm, respectively. The color components constitute a color space (including a color plane). Hue and saturation are excluded from the "color components".

In the preprocessing unit 220a, a reference axis in the RG plane necessary for evaluating the biological tissue redness and the blood vessel redness is set.

In a biological tissue in a body cavity of a patient, which is an object, an R component of image color components is dominant over the other components (G component and B component) due to an influence of a hemoglobin pigment and the like. When the degree of progression of the lesion at the lesion part is low and the lesion part is an inflamed part, the stronger the inflammation, the stronger the red color (R component) becomes against other colors (G component and B component). However, a color of a captured image in the body cavity changes depending on an imaging condition (for example, a degree of contact of illumination light) that affects brightness. Illustratively, a shaded area where the illumination light does not reach is black (achromatic color; for example, the values of the image color components of R, G, and B are zero or close to zero), and an area where the illumination light is strongly hit and reflected regularly is white (achromatic color; for example, when the values of the R, G, and B image color components are 8-bit shade, the values are 255 or close to 255). That is, even when the same inflamed part where inflammation is occurring is imaged, the pixel value of the inflamed part increases as the illumination light hits the image strongly. Therefore, depending on the degree of contact of the illumination light, the value of the color component of the image may take a value having no correlation with the intensity of inflammation.

In general, a healthy part within the body cavity where the inflammation is not occurring is covered with a sufficient mucous membrane. On the other hand, the inflamed part in the body cavity where inflammation is occurring is not covered with a sufficient mucous membrane. Specifically, since blood and body fluids leak from the blood vessel simultaneously with dilation of the blood vessel, the mucous membrane becomes relatively thin, such that a color of the blood becomes easily visible. The mucosa is basically white, but the color is slightly yellowish, and the color (yellow) that appears on the image changes depending on the shading (thickness of the mucosa). Therefore, the shading of the mucosa is also considered to be one of the indexes for evaluating the degree of inflammation.

Figure 4:
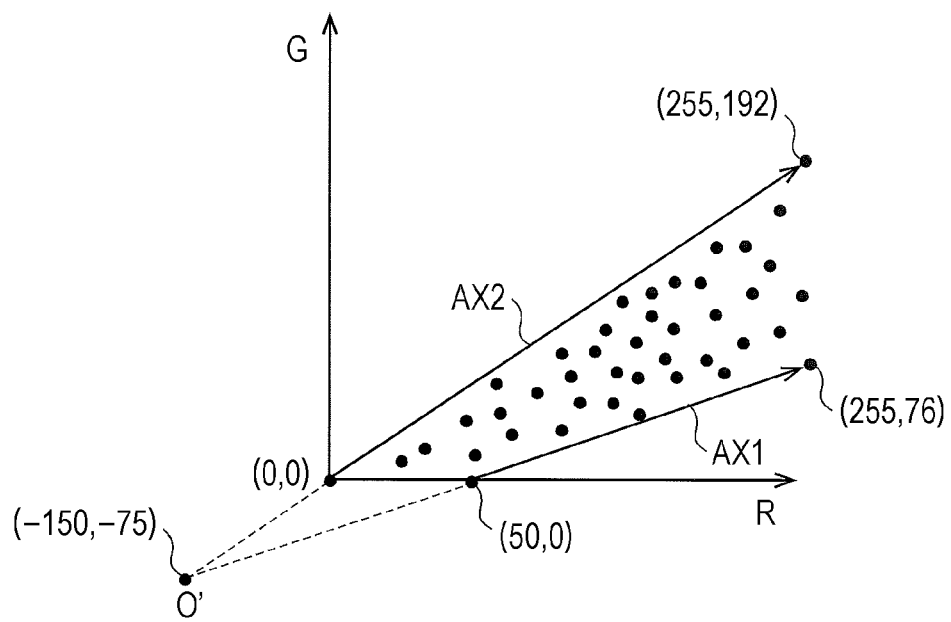
FIG. 4 is a diagram illustrating an example of a reference axis in a color space used in the processor for an endoscope according to one embodiment.

Therefore, as illustrated in FIG. 4, in the RG color space, a straight line passing through (50,0) and (255,76) is set as one of reference axes, and a straight line passing through (0,0) and (255,192) is set as one of reference axes. For convenience of description, the former reference axis will be referred to as a "hemoglobin change axis AX1", and the latter reference axis will be referred to as a "mucosal change axis AX2". FIG. 4 is a diagram illustrating an example of a reference axis in a color space used in one embodiment.

The plot illustrated in FIG. 4 is obtained as a result of analyzing a large number of reference images in the body cavity. The reference images used for the analysis include the example of inflammatory image of each stage such as an example of an inflammatory image with the highest degree of inflammation (an example of an inflammatory image with the most severe level) and an example of an inflammatory image with the lowest degree of inflammation (an example of an image substantially considered to be a healthy part). In the example illustrated in FIG. 4, only a part of the plot obtained as a result of the analysis is illustrated for the sake of clarity of the drawing. The number of plots actually obtained as a result of the analysis is much larger than the number of plots illustrated in FIG. 4.

As described above, the stronger the inflammation, the stronger the R component of the color components of the image is with respect to the other components (G component and B component). Therefore, the axis on the boundary line between the region where the plots are distributed and the region where the plots are not distributed, which is closer to the R axis than the G axis, in the example illustrated in FIG. 4, the axis on the boundary line passing through (50,0) and (255,76) is set as the axis highly correlated with the portion where the degree of inflammation is the strongest, that is, the site where the degree of inflammation is the highest. The axis is the hemoglobin change axis AX1. On the hemoglobin change axis AX1, plots corresponding to the inflamed part having the highest degree of inflammation imaged under various imaging conditions, for example, according to the degree of contact of the illumination light, are superimposed. Therefore, the hemoglobin change axis AX1 is the axis on which the pixel correspondence points plotted are converged as the degree of inflammation of the biological tissue increases.

On the other hand, the closer to the healthy part, the stronger the G component (or B component) of the color components of the image is with respect to the R component. Therefore, the axis on the boundary line between the region where the plot is distributed and the region where the plot is not distributed, which is closer to the G axis than the R axis, and the axis on the boundary line passing through (0,0) and (255,192) in the example illustrated in FIG. 4 are set as the axis having a high correlation with the portion having the lowest degree of inflammation, that is, the portion having the lowest degree of inflammation, which is regarded as a substantially healthy part. This axis is the mucosal change axis AX2. The mucosal change axis AX2 is superimposed with plots corresponding to various imaging conditions, for example, the portion having the lowest degree of inflammation imaged according to the degree of contact of the illumination light, that is, what is considered to be a substantially normal portion. Therefore, the mucosal change axis AX2 is the axis on which the pixel correspondence points plotted converge as the degree of inflammation decreases (closer to the healthy part).

Moreover, the portion of the lesion part with the highest degree of lesion progression involves bleeding. Meanwhile, since the part with the lowest degree of progression of the lesion is a substantially normal healthy part, the part is covered with a sufficient mucous membrane. Therefore, the plot in the RG color space illustrated in FIG. 4 can be regarded as being distributed in a region sandwiched between the axis having the highest correlation with the color of blood (hemoglobin pigment) and the axis having the highest correlation with the color of the mucous membrane. Therefore, of the boundary lines between the region where the plots are distributed and the region where the plots are not distributed, the boundary line closer to the R axis (strong R component) corresponds to the axis (hemoglobin change axis AX1) indicating the inflamed part having the highest degree of inflammation, and the boundary line closer to the G axis (strong G component) corresponds to the axis (mucosal change axis AX2) indicating the inflamed part having the lowest degree of inflammation.

After the setting of the reference axes is performed as described above, processing for calculating a biological tissue redness indicating a degree of red to be described later is performed on color components of a normally projected image. Before the process of calculating the biological tissue redness, color correction is performed on the normally projected pixel data.

The reference axis illustrated in FIG. 4 is an example, and the reference axis varies depending on the type of disease.

The preprocessing unit 220*a* performs color correction on the color components of the image represented in the RG color space before calculating the inflammation evaluation value. A correction matrix coefficient is stored in a memory (not illustrated). The preprocessing unit 220*a* corrects pixel data (R, G), which is a pixel correspondence point in the RG color space of each pixel, as illustrated in the following formula using a correction matrix coefficient such that an inflammation evaluation value to be described later does not vary (in other words, in order to suppress an inter-individual error of the electronic endoscope) when images are captured by different electronic endoscope systems regardless of the same inflamed part.

$$\begin{pmatrix} R_{new} \\ G_{new} \end{pmatrix} = \begin{pmatrix} M_{00} & M_{01} \\ M_{10} & M_{11} \end{pmatrix} \begin{pmatrix} R \\ G \end{pmatrix}$$

$R_{new}$: Corrected pixel data (R component)
$G_{new}$: Corrected pixel data (G component)
$M_{00}$ to $M_{11}$: Correction matrix coefficient
R: Pixel data before correction (R component)
G: Pixel data before correction (G component)

Figure 5:
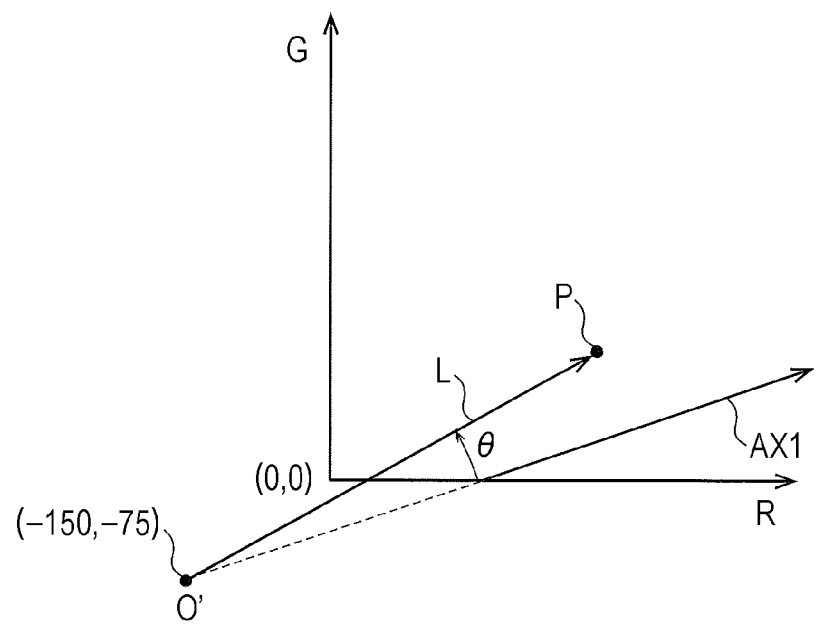
FIG. 5 is a diagram for describing a method of calculating a deviation angle for calculating biological tissue redness used in the processor for an endoscope according to one embodiment.

The feature amount calculation unit 220*b* selects one target pixel from among the pixels, and calculates, for the selected target pixel, a deviation angle for calculating the degree of inflammation with respect to the biological tissue redness based on the information on the color component of the target pixel. That is, numerical processing is performed to quantify the degree of redness of the biological tissue based on the information on the color component of the pixel. FIG. 5 is a diagram for describing a method of calculating a deviation angle for calculating biological tissue redness used in one embodiment. Specifically, as illustrated in FIG. 5, the feature amount calculation unit 220*b* sets an intersection between the hemoglobin change axis AX1 and the mucosal change axis AX2 as a reference point O', and calculates a deviation angle θ at which the direction of a line segment L connecting the reference point O' and the pixel correspondence point P of the target pixel is shifted with respect to the hemoglobin change axis AX1. The reference point O' is located at a coordinate (−150, −75). The example in which the reference point O' is set to the coordinates (−150, −75) is given, but the invention is not limited to this. The reference point O' can be changed as appropriate, and may be, for example, the intersection of the R axis and the G axis in the RG color space.

A suitable coordinate position as the reference point O' is, for example, a position where an error in the evaluation result due to fluctuations in brightness can be reduced. Specifically, the reference point O' is preferably set by obtaining a point in advance where an error between the evaluation result in the dark portion (brightness is less than a predetermined value) and the evaluation result in the non-dark portion (brightness is more than a predetermined value) is minimized.

Furthermore, for example, when the reference point O' is set between the coordinates (−10, −10) and (10, 10), the amount of change in the angle θ in a case where the pixel correspondence point changes becomes larger as compared with a case where the coordinates (−150, −75) and the like are set as the reference point O', and thus the resolution is improved. As a result, a highly accurate evaluation result can be obtained.

Meanwhile, by setting the reference point O' between the coordinates (−50, −50) and (−200, −200), the evaluation result indicating the degree of inflammation is hardly affected by noise.

When brightness of a captured image of the biological tissue in the body cavity changes depending on the degree of contact of white light, a color of the image is affected by an individual difference, an imaging place, a state of inflammation, or the like, but in the RG color space, generally, the color of the image changes along the hemoglobin change axis AX1 in an inflamed part with the highest severity and changes along the mucosal change axis AX2 in an inflamed part with the lowest degree of inflammation. In addition, it is presumed that the color of the image of the inflamed part where the degree of inflammation is intermediate changes with the same tendency. That is, the pixel correspondence point corresponding to the inflamed part shifts in an azimuthal angle direction from the reference point O' as a starting point when the pixel correspondence point changes depending on the degree of contact of the illumination light. In other words, when the pixel correspondence point corresponding to the inflamed part changes depending on the degree of contact of the illumination light, the deviation angle θ with respect to the mucosal change axis AX2 moves while being constant, and the distance to the reference point O' changes. This means that the deviation angle θ is a parameter that is substantially unaffected by changes in the brightness of the image.

The smaller the deviation angle θ, the stronger the R component with respect to the G component, indicating that the degree of redness in the lesion part is relatively large. Further, the larger the deviation angle θ, the stronger the G component with respect to the R component, indicating that the degree of redness is relatively small. Therefore, the feature amount calculation unit 220*b* normalizes the angle θ so that the value becomes 255 when the deviation angle θ is zero and the value becomes zero when the deviation angle θ is $\theta_{MAX}$. Further, $\theta_{MAX}$ is equal to the angle formed by the hemoglobin change axis AX1 and the mucosal change axis AX2. That is, the feature amount calculation unit 220*b* performs, for each target pixel, numerical processing of quantifying the degree of red based on the information on the color component of each target pixel, thereby obtaining the biological tissue redness (first pixel evaluation value) falling within the range of 0 to 255.

The target pixel is selected one by one for all the pixels of the image.

In the example illustrated in FIG. 5, the RG color space is used as the color space, but the RB color space may be used instead of the RG color space.

The feature amount calculation unit 220*b* calculates the biological tissue redness as the first pixel evaluation value based on the deviation angle θ, and in some cases, calculates a biological tissue whiteness (third pixel evaluation value) to be described later indicating the degree of the feature of the ulcer of the biological tissue. For example, by performing tone enhancement processing of performing gain adjustment to give a linear gain (gain) to a pixel value of each color component of each pixel of an image of a biological tissue, substantially widening a dynamic range in the vicinity of a color gamut specific to a lesion, and enhancing an effective resolution of color representation, for example, an ulcerated part including white mosses or pus-like mucus of ulcerative colitis indicates white, and can be distinguished by a color component from an inflamed part indicating red including edema and easy bleeding and a normal portion indicating yellow or green. The biological tissue whiteness can be calculated using a deviation angle with respect to a reference axis different from the hemoglobin change axis AX1 expressed on a color space as coordinate axes of two color components (two of R component, G component, and B component) or three color components (R component, G component, B component) as illustrated in FIG. 5. The tone enhancement processing is performed by the preprocessing unit 220*a*.

The feature amount calculation unit 220*b* further creates a color map image obtained by tessellating the image of the biological tissue with a display color that changes according to the biological tissue redness. In order to enable display of the color map image, a table in which the pixel evaluation value and a predetermined display color are associated with each other is stored in a storage area such as a memory (not illustrated). In this table, for example, different display colors are associated at an interval of 5. For example, blue is associated with a pixel evaluation value in a range of 0 to 5, and different display colors are associated according to the order of colors in the color wheel every time the pixel evaluation value increases by 5, and red is associated with the pixel evaluation value in a range of 250 to 255. The display color is a color that approaches a warm color from a cold color, for example, from blue to yellow to red as the biological tissue redness increases. The feature amount calculation unit 220*b* refers to the above table and determines the display color of the selected target pixel on the color map image according to the biological tissue redness of the target pixel.

In this way, the feature amount calculation unit 220*b* creates the color map image to which a color is applied according to the biological tissue redness.

The feature amount calculation unit 220b further determines certainty of the blood vessel region of the biological tissue in the image obtained by imaging the biological tissue based on the shape characterizing the blood vessel, and extracts the blood vessel region according to the obtained certainty as necessary.

Figure 6:
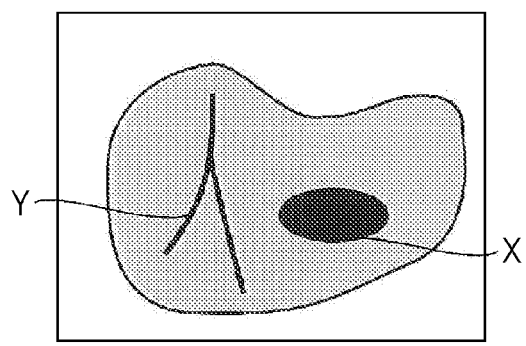
FIG. 6 is a view schematically illustrating an example of an image of a biological tissue and an example of a color map image obtained by a conventional method.
Figure 6:
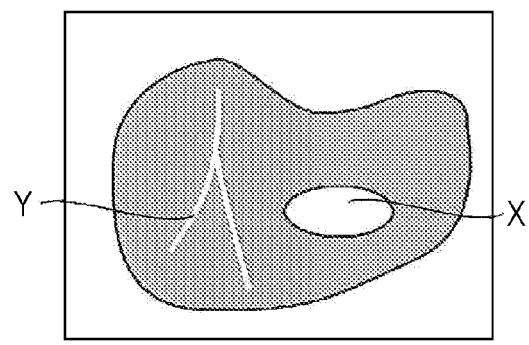

As illustrated in FIG. 6, in the image obtained by imaging the biological tissue, an image of a streak-shaped blood vessel region Y that can be seen through the mucous membrane is also included in the vicinity of the lesion part X. Moreover, in the color map image illustrated in FIG. 6 in which such an image is color-coded according to the above-described biological tissue redness, the blood vessel region Y may be displayed in the same color as the inflamed part. FIG. 6 is a diagram schematically illustrating an example of an image of a biological tissue and an example of a color map image obtained by a conventional method.

The feature amount calculation unit 220b obtains the certainty of the blood vessel region Y and extracts the blood vessel region Y based on the certainty.

Figure 7:
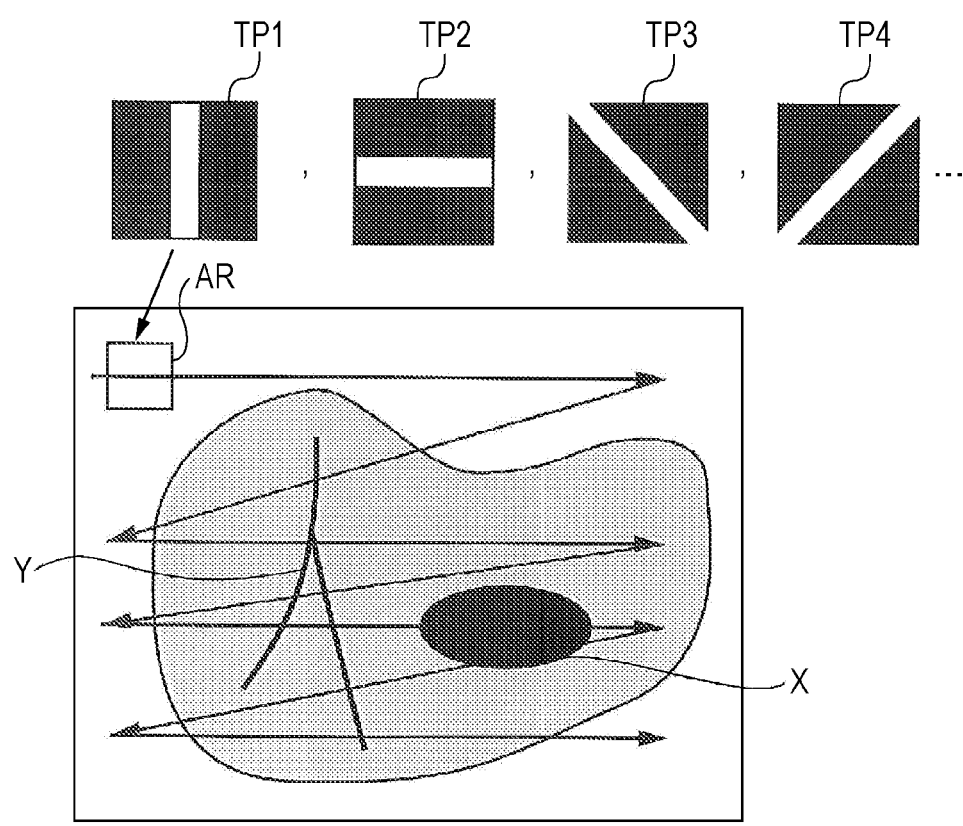
FIG. 7 is a diagram illustrating an example of a method of extracting a blood vessel region performed by the processor for an endoscope according to one embodiment.

FIG. 7 is a diagram illustrating an example of a method of extracting the blood vessel region Y according to one embodiment.

The feature amount calculation unit 220b obtains a matching degree indicating the degree of correlation between a shape of an inspection target area AR of a part of the image of the biological tissue and the straight line shapes of the plurality of templates TP1 to TP4, and sets the highest matching degree among the matching degrees corresponding to the plurality of templates TP1 to TP4 as the certainty of the blood vessel region Y in the inspection target area AR. The templates TP1 to TP4 are configured to include pixels, and the templates TP1 to TP4 have a plurality of straight line shapes having different straight line extending directions. In the templates TP1 to TP4, each pixel has a pixel value in accordance with each straight line shape. As illustrated in FIG. 7, by moving the inspection target area AR in order from the end of the image along the arrow while overlapping the inspection target area AR, the degree of correlation between the pixel evaluation value of the image in the inspection target area AR and the value of the corresponding pixel of each of the templates TP1 to TP4 is obtained. According to the embodiment, the templates TP1 to TP4 have four straight line shapes extending in four different extending directions as shapes featured by the blood vessel. In a case where the inspection target area AR includes a blood vessel region, since the pixel value in the inspection target area AR includes information on a feature shape such that the blood vessel extends in a streak shape, the blood vessel region Y can be extracted using an image having a pixel evaluation value set according to the deviation angle θ as a pixel value. The templates TP1 to TP4 have values for the respective pixels corresponding to the white region and the black region illustrated in FIG. 6. Therefore, according to one embodiment, the matching degree is a correlation coefficient between the values of the pixels of the templates TP1 to TP4 and the corresponding pixel evaluation value of the inspection target area AR. In addition, according to the embodiment, the matching degree may be a total value obtained by multiplying each filter coefficient by an image evaluation value of the corresponding pixel of the inspection target area AR, by using the values for each pixel of the templates TP1 to TP4 as filter coefficients of a spatial filter.

The highest matching degree having the greatest value in the matching degrees calculated for the respective templates TP1 to TP4 is assigned to a central pixel of the inspection target area AR, as the value indicating the certainty of the blood vessel region.

FIG. 8 is a diagram illustrating an example of the filter coefficient in a case where the template TP1 is used as the spatial filter. As illustrated in FIG. 8, the template TP1 has a shape in which a straight line extends in an up-down direction in the drawing. In FIG. 7, as an example, the template TP1 constitutes a spatial filter of 5×5 pixels. In this case, $1/5$ is assigned as the filter coefficient to the pixels of the portion extending in the straight line shape, and $-1/20$ is assigned as the filter coefficient to the other pixels. When the total value obtained by multiplying each of the filter coefficients by the image evaluation value of the corresponding pixel of the inspection target area AR is calculated as the matching degree, in a case where all of the pixel evaluation values of the inspection target area AR are values the same as each other, the matching degree is zero. Meanwhile, when the inspection target area AR includes an image of the blood vessel extending in a streak shape in the up-down direction, the matching degree increases. As the value of the matching degree increases, it can be described that the inspection target area AR includes the image that approximates the template TP1. Therefore, the matching degree is calculated for each of the templates TP1 to TP4, and the highest matching degree having the highest value among the calculated matching degrees is given to the central pixel of the inspection target region AR as the certainty of the blood vessel region Y. That is, the value of the certainty of the blood vessel region Y is given to the central pixel of the inspection target area AR.

Since the matching degree is a result of spatially filtering the pixel evaluation value, which is the biological tissue redness, using each of the templates TP1 to TP4, the value of each pixel of the image in which each pixel has the pixel evaluation value processed by the spatial filtering includes information on the matching degree when matching is performed with any of the templates TP1 to TP4, and the image obtained by the spatial filtering is a pixel value reflecting the blood vessel region Y. Therefore, the feature amount calculation unit 220b determines whether the value of the certainty of the blood vessel in each pixel is larger than a predetermined value, and when the value of the certainty of the blood vessel in the pixel is larger than the predetermined value, the feature amount calculation unit extracts the blood vessel region Y by determining that the pixel is in the blood vessel region Y.

The feature amount calculation unit 220b determines biological tissue redness in a pixel corresponding to the extracted blood vessel region Y as blood vessel redness. In this case, the blood vessel redness in the region not corresponding to the blood vessel region Y is set to zero. In addition, the feature amount calculation unit 220b may obtain a value obtained by normalizing the certainty of the blood vessel to a range of 0 to 1, and obtain a result of correcting the biological tissue redness such that the higher the value, the higher the value, and the lower the value, the lower the value, as the blood vessel redness. In this manner, the blood vessel redness is calculated for all the pixels. For example, a result obtained by multiplying the value of biological tissue redness by the value of certainty of the blood vessel may be obtained as the blood vessel redness.

As described above, the feature amount calculation unit 220b according to one embodiment calculates the biological tissue redness as the first pixel evaluation value, and calculates the blood vessel redness as the second pixel evaluation value. Therefore, the first pixel evaluation value in this embodiment is an evaluation value indicating the degree of the color component indicated by the inflamed part of the image, and the second pixel evaluation value is an evaluation value indicating the degree of the color component included in the blood vessel shaped portion in the image.

The representative value calculation unit 220c calculates a representative value (first representative evaluation value) of the biological tissue redness of the imaged biological tissue by collecting the biological tissue redness (first pixel evaluation value) of each pixel calculated by the feature amount calculation unit 220b, and further calculates a representative value (second representative evaluation value) of the imaged blood vessel redness by collecting the blood vessel redness (second pixel evaluation value) of each pixel calculated by the feature amount calculation unit 220b.

The processing of calculating the representative value of the biological tissue redness and the representative value of the blood vessel redness, which are the representative evaluation values in the image, may be averaging processing of calculating an average value of the biological tissue redness and the blood vessel redness of each pixel, or may be another known processing, for example, processing of obtaining a median value. The averaging processing includes processing of obtaining a simple average value and processing of obtaining a weighted average value. Furthermore, as known processing, processing of dividing each of the biological tissue redness and the blood vessel redness, which are pixel evaluation values, into at least two or more ranked levels, and substituting a total value P of values obtained by multiplying the number of pixels belonging to each level by a predetermined weighting coefficient into a predetermined equation to calculate a representative value may be used. In this case, for example, the predetermined equation is $1/(1+e^{-P})$. In this case, the weighting coefficient is preferably a coefficient obtained by multiple logistic regression analysis to have a correlation with a subjective evaluation result presented by a doctor.

Figure 9:
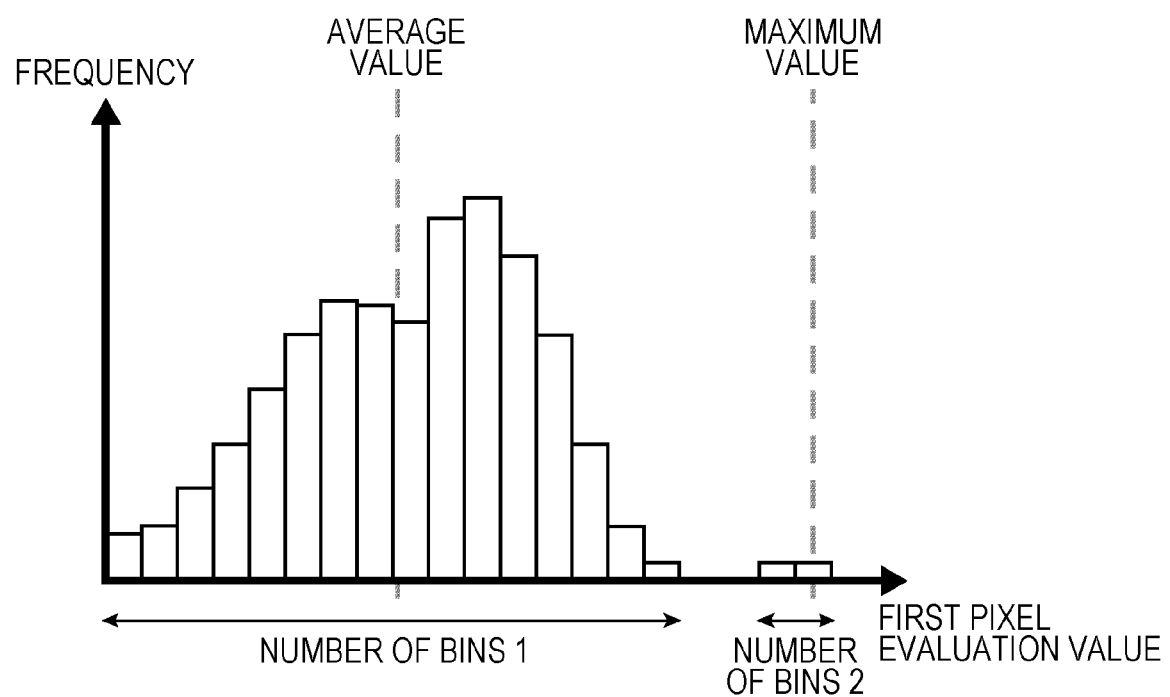
FIG. 9 is a diagram illustrating an example of a representative evaluation value used in the processor for an endoscope according to one embodiment.

In one embodiment, the representative evaluation value in the image is also preferably the total number of bins (data intervals) with a frequency of one or more in the histogram of pixel evaluation values for each pixel. FIG. 9 is a diagram illustrating an example of a representative evaluation value used in the endoscope system according to one embodiment. In the example illustrated in FIG. 9, the number of bins in the range of the pixel evaluation value having the frequency of 1 or more is specifically 16 for the number of bins 1 and 2 for the number of bins 2. Therefore, in the example illustrated in FIG. 9, the representative evaluation value is the total number of bins 18 (=16+2). When the total number of bins is used as the representative evaluation value, the data section in the histogram is preset and fixed.

Conventionally, in a case where an average value or a maximum value of pixel evaluation values is used as a representative evaluation value, even when a pixel having a high pixel evaluation value does not change, if the number of pixels having a low pixel evaluation value (for example, a pixel having a low degree of red in biological tissue redness) increases, the number of pixels having a low pixel evaluation value is dragged by the amount of pixels having a low pixel evaluation value, and the average value is lowered. In addition, even when a pixel having a high pixel evaluation value does not change much, the maximum value increases when a noise component is mixed into the maximum pixel evaluation value to increase the pixel evaluation value. As described above, it is not preferable that the representative evaluation value fluctuates by being dragged by the amount of pixels of the pixel evaluation value that is no interest or by being dragged by the noise component in order to calculate the severity with high accuracy. In this regard, the total number of bins is not dragged by the amount of pixels having a pixel evaluation value of no interest, and is not affected by a noise component, and thus can be used as a robust and stable representative evaluation value. Therefore, it is possible to stably calculate the severity with high accuracy.

When such the total number of bins is used as the representative evaluation value, preferably, the representative evaluation value is applied to a value indicating the degree of color components exhibited by the inflamed part of the biological tissue, for example, a representative value of biological tissue redness. Since the inflamed part of a biological tissue has a high degree of red, whereas the healthy part other than the inflamed part has a low degree of red, it is preferable to use the total number of bins as the representative evaluation value in terms of obtaining a stable representative evaluation value.

The integration unit 220d calculates the severity of the lesion by integrating the representative value (first representative evaluation value) of the biological tissue redness and the representative value (second representative evaluation value) of the blood vessel redness. That is, the severity of the lesion is calculated based on the representative value (first representative evaluation value) of the biological tissue redness and the representative value (second representative evaluation value) of the blood vessel redness. At that time, the integration unit 220d adjusts the influence degree of the representative value (first representative evaluation value) of the biological tissue redness indicating the change in severity with respect to the change in the representative value (first representative evaluation value) of the biological tissue redness based on the representative value of the blood vessel redness. In this way, since the influence degree of the representative evaluation value on the severity is adjusted, the degree of progression of the lesion in the lesion part of the biological tissue can be evaluated with higher accuracy compared to the related art.

Figure 10:
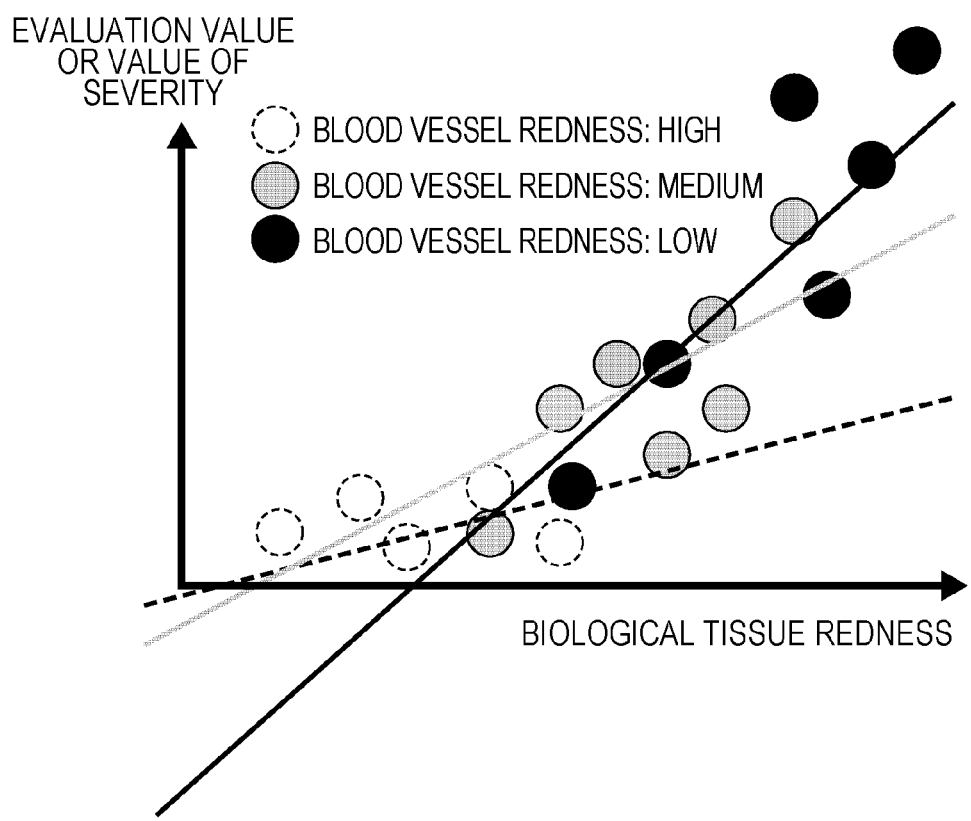
FIG. 10 is a diagram illustrating an example of an influence degree of a representative value of biological tissue redness used in the processor for an endoscope according to one embodiment.

FIG. 10 is a diagram illustrating an example of the influence degree of the representative value of biological tissue redness. A plot (circle mark) illustrated in FIG. 10 indicates an evaluation value (value of severity) indicating the degree of progression of the lesion in the reference image with respect to the representative value of the biological tissue redness in the reference image. At this time, three values of high (white dotted circle), medium (gray circle), and low (black circle) are exemplified as the representative value of the blood vessel redness. Three straight lines represented by a black dotted line, a gray solid line, and a black solid line indicate regression straight lines calculated so as to be most highly correlated with the evaluation value when the representative value of the blood vessel redness is high, medium, and low. As can be seen from the drawing, the influence degree (gradient of the regression straight line) of the biological tissue redness on the value of the severity varies depending on the representative value of the blood vessel redness. In the example illustrated in FIG. 10, the smaller the representative value of the blood vessel redness, the greater the influence degree on the severity of the representative value of the biological tissue redness. Therefore, when calculating the severity of the lesion, the influence degree of the representative value (first representative evaluation value) of the biological tissue redness is adjusted based on the representative value (second representative evaluation value) of the blood vessel redness.

The adjustment of the influence degree is adjusted at least based on the second representative evaluation value different from the first representative evaluation value, but is not limited to the adjustment based on the second representative evaluation value. For example, the influence degree may be adjusted based on information on another color component (second color component) of the image different from the red component of the inflamed part of the biological tissue used when calculating the first representative evaluation value. The other color component (second color component) may be, for example, a feature amount related to a color component exhibited by a cake (residue) of food or the like introduced into the body cavity from the outside and present on the biological tissue. In the residue of food or the like, the blue component exhibits a relatively strong brown as compared with the hue of blood or the like, and thus, for example, the ratio of the B signal to the G signal among the R, G, and B signals of the image can be used as the feature amount related to the color component exhibited by the residue of food or the like.

According to one embodiment, when the severity is calculated according to a polynomial having at least the first representative evaluation value as an explanatory variable, the influence degree is preferably related to a coefficient related to the first representative evaluation value of the polynomial. Since the coefficient relating to the first representative evaluation value is adjusted when the severity is calculated using the polynomial, the influence degree of the first representative evaluation value can be easily changed.

According to one embodiment, the polynomial may be a prediction formula (for example, the regression equation) obtained by pre-processing. Specifically, using the reference image in which the evaluation value that is the evaluation result of the degree of progression of the lesion is determined, the first pixel evaluation value (for example, a representative value of biological tissue redness) and the value (for example, the feature amount regarding the color component exhibited by the residue) indicating the information on the second color component or the second pixel evaluation value (for example, a representative value of blood vessel redness) are used as explanatory variables, the evaluation value in the reference image is used as the value of the severity, and the regression equation can be obtained (optimization of the prediction formula is performed) by performing multiple regression analysis on the severity in advance such that the calculated severity corresponds to the evaluation value with the strongest correlation, using the severity as an objective variable. As a result, a regression equation that can optimally calculate the severity can be obtained.

In the example illustrated in FIG. 1, specifically, a regression equation is obtained by performing multiple regression analysis in advance using a plurality of reference images in which evaluation results of the degree of progression of a lesion are determined, using at least a representative value (first representative evaluation value) of biological tissue redness, a representative value (second representative evaluation value) of blood vessel redness, and a representative value (third representative evaluation value) of biological tissue whiteness as explanatory variables, and using the severity in the reference image as an objective variable. This regression equation is used as an optimized prediction formula for calculation of severity using an image to be evaluated captured by an electronic endoscope.

According to one embodiment, when the first representative evaluation value is X and the second representative evaluation value is Y, the integration unit 220d preferably performs calculation according to severity=$\alpha_1 \cdot X + \beta_1 \cdot Y + \gamma_1 \cdot X \cdot Y + d_1$ using coefficients $\alpha_1$, $\beta_1$, and $\gamma_1$ and a constant $d_1$. The first representative evaluation value and the second representative evaluation value are not limited to any of the representative value of the biological tissue redness, the representative value of the blood vessel redness, and the representative value of the biological tissue whiteness, and may be representative evaluation values calculated based on the features of other lesion parts.

Furthermore, according to another embodiment, in a case where there is a second color component that does not affect the severity but affects the influence degree of the first representative evaluation value, the integration unit 220d preferably calculates the severity according to severity=$\alpha_2 \cdot X + \beta_2 \cdot X \cdot Z + d_2$ using coefficients $\alpha_2$ and $\beta_2$ and a constant $d_2$, where the first representative evaluation value is X and a value (representative value) indicating information on the second color component is Z. The first representative evaluation value is not limited to any one of the representative values of the biological tissue redness, the representative value of the blood vessel redness, and the representative value of the biological tissue whiteness, and may be a representative evaluation value calculated based on the feature of another lesion part. The information on the second color component is preferably a feature amount related to the color component exhibited by the residue on the biological tissue introduced into the body cavity from the outside, but is not limited to the feature amount related to the color component exhibited by the residue such as food on the biological tissue.

When calculated according to severity=$\alpha_1 \cdot X + \beta_1 \cdot Y + \gamma_1 \cdot X \cdot Y + d_1$, the severity=$(\alpha_1 + \gamma_1 \cdot Y) \cdot X + \beta_1 \cdot Y + d_1$ is expressed, so that the influence degree of the first representative evaluation value is adjusted based on $\alpha_1 + \gamma_1 \cdot Y$, that is, the second representative evaluation value. Similarly, when calculated according to severity=$\alpha_2 \cdot X + \beta_2 \cdot X \cdot Z + d_2$, severity=$(\alpha_2 + \beta_2 \cdot Z) \cdot X + d_2$ is expressed, and thus, the influence degree of the first representative evaluation value is adjusted based on $\alpha_2 + \beta_2 \cdot Z$, that is, the information on the second color component.

The influence degree can be easily changed using such a prediction formula.

According to one embodiment, the integration unit 220d preferably adjusts the influence degree of the first representative evaluation value by using at least a third representative evaluation value obtained by collecting third pixel evaluation values indicating a degree of another third feature different from the first feature and the second feature in addition to the second representative evaluation value or the value (representative value) indicating the information on the second color component. When the first representative evaluation value is X, the second representative evaluation value is Y, and the third representative evaluation value is Z, calculation is performed using coefficients $\alpha_3$, $\beta_3$, $\gamma_3$, $\sigma_3$, $\theta_3$, $\omega_3$, $\varphi_3$ and a constant $d_3$, for example, according to severity=$\alpha_3 \cdot X + \beta_3 \cdot Y + \gamma_3 \cdot Z + \sigma_3 \cdot X \cdot Y + \theta_3 \cdot X \cdot Z + \omega_3 \cdot Y \cdot Z + \varphi_3 \cdot X \cdot Y \cdot Z + d_3$. In this case, the influence degree of the first representative evaluation value X is $(\alpha_3 + \sigma_3 \cdot Y + \theta_3 \cdot Z + \varphi_3 Y \cdot Z)$.

The integration unit 220d can also adjust the influence degree of the first representative evaluation value based on a value (representative value) indicating the information on the second color component described above in addition to the second representative evaluation value. When the first representative evaluation value (for example, a representative value of biological tissue redness) is X, the second representative evaluation value (representative value of the blood vessel redness) is Y, and the value indicating the information on the second color component (for example, the color component represented by the residue) is Z, the calculation is performed using coefficients $\alpha_4$, $\beta_4$, $\sigma_4$, $\theta_4$, and $\varphi_4$ and a constant $d_4$, for example, according to severity=$\alpha_4 \cdot X + \beta_4 \cdot Y + \sigma_4 \cdot X \cdot Y + \theta_4 \cdot X \cdot Z + \varphi_4 \cdot X \cdot Y \cdot Z + d_4$. In this case, while the influence degree of the first representative evaluation value X changes due to the influence of the second representative evaluation value Y and the value Z, the second representative evaluation value Y alone contributes to the severity, and the value Z alone does not contribute to the severity. The influence degree of the first representative evaluation value X is ($\alpha_4 + \sigma_4 \cdot Y + \theta_4 \cdot Z + \varphi_4 \cdot Y \cdot Z$). That is, the influence degree can be easily changed using such a prediction formula.

According to one embodiment, it is preferable that the appearance feature appearing at the lesion part used for calculating the severity is any one of the degree of the color component (red) exhibited by the inflamed part of the biological tissue, the degree of the color component (red) exhibited by the blood vessel region indicating the blood vessel extending in a streak shape in the biological tissue, and the degree of the color component (white) exhibited by the ulcerated part of the biological tissue in order to accurately calculate the severity.

The integration unit 220d generates a signal for screen display together with the color map image created by the feature amount calculation unit 220b, and sends the calculated severity to the monitor 300.

Figure 11:
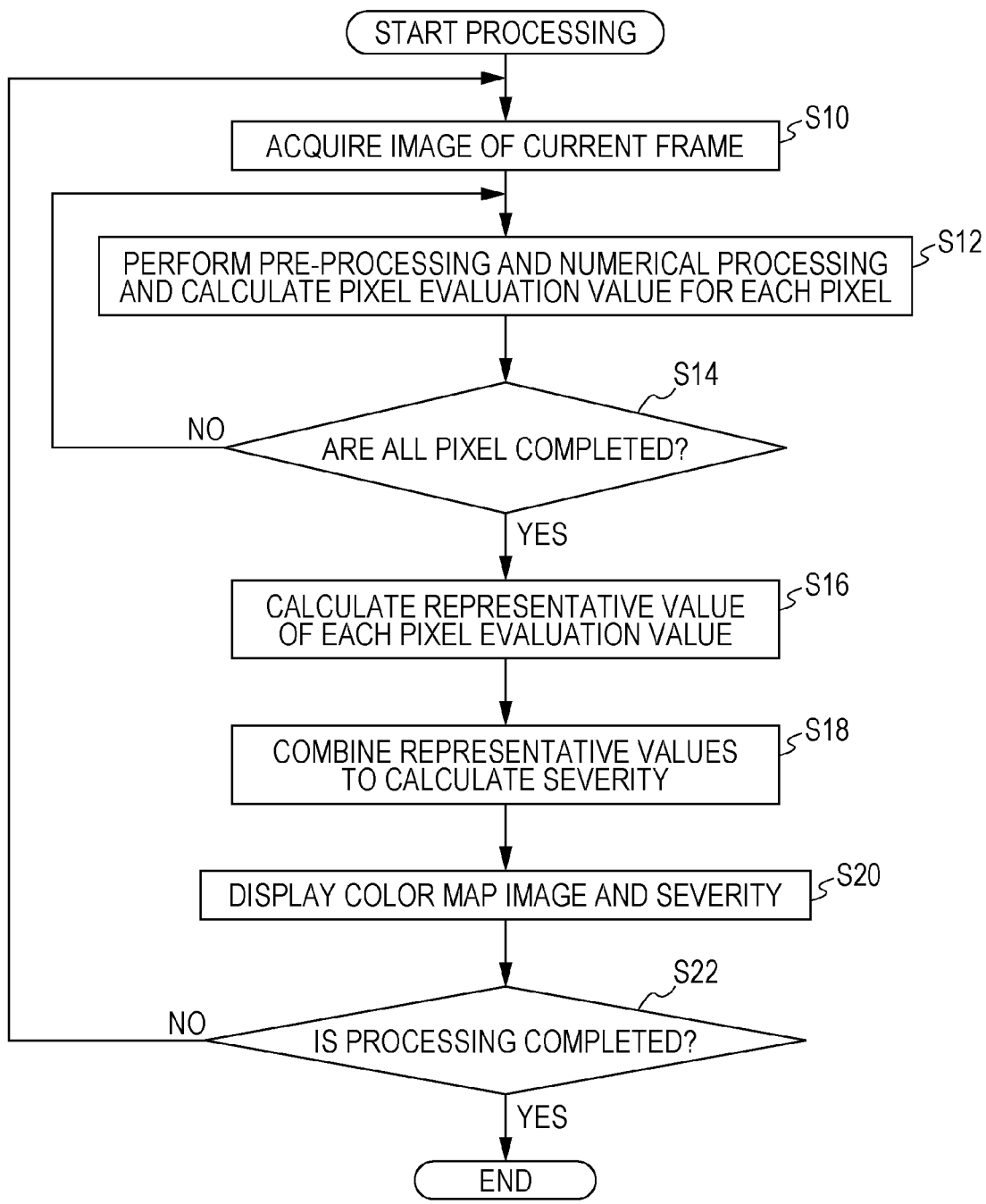
FIG. 11 is a diagram illustrating an example of a flow of a method of calculating severity performed by the processor for an endoscope according to one embodiment.

FIG. 11 is a diagram illustrating an example of a flow of a method of calculating the severity performed by the endoscope system according to one embodiment.

First, the image processing unit 220 acquires the image of the current frame (Step S10).

Next, the preprocessing unit 220a performs pre-processing including the above-described RGB conversion, color space conversion, setting of a reference axis, and color correction, and tone enhancement processing as necessary, and further, the feature amount calculation unit 220b calculates, for each pixel, a plurality of pixel evaluation values (first pixel evaluation value, second pixel evaluation value, and third pixel evaluation value) indicating the degree of each of a plurality of features related to the color component or a shape indicated by the lesion part, for example, the biological tissue redness, the blood vessel redness, the biological tissue whiteness, and the like, for the preprocessed image (Step S12).

The feature amount calculation unit 220b determines whether or not the pixel evaluation value has been calculated for all the pixels of the image of the current frame (Step S14). When the calculation of the pixel evaluation values for all the pixels is completed, the representative value calculation unit 220c calculates representative values obtained by integrating the pixel evaluation values, that is, representative values such as the first to third representative evaluation values (Step S16). The representative value is calculated for each type of pixel evaluation value.

Thereafter, the integration unit 220d combines a plurality of representative values (representative evaluation values) to calculate one severity (Step S18). That is, one numerical value obtained by calculating and integrating the plurality of representative values (representative evaluation values) is calculated as the severity of the lesion. In the calculation of the severity, for example, the regression equation having the plurality of representative values (representative evaluation values) obtained in the pre-processing as described above as explanatory variables is used. This regression equation is an equation that most corresponds to the subjective evaluation result regarding the severity.

Thereafter, the integration unit 220d generates a signal for displaying the color map image generated from the pixel evaluation value calculated in Step S12 and the severity calculated in Step S18 on the screen, and sends the signal to the monitor 300. As a result, the monitor 300 displays the color map image and the information on the severity (Step S20).

In this way, the image processing unit 220 repeats the above processing while the captured images are sequentially transmitted from the electronic endoscope 100 (Step S22).

Since the severity calculated in this manner is displayed on the screen of the monitor 300, the user can recognize the degree of progression of the lesion by viewing the monitor 300.

Next, another embodiment of the present invention will be described.

As described above, in the conventional endoscope system, a plurality of representative evaluation values is calculated by integrating the calculated pixel evaluation values of each pixel for each of a plurality of appearance features, and at least two representative evaluation values among the plurality of calculated representative evaluation values are calculated and integrated to obtain one numerical value as the value of the severity of the lesion. The above calculation is performed in accordance with a formula representing a relationship between severity and a plurality of representative evaluation values in advance.

However, in a case where the same formula is used even when the imaged positions are different, the calculated representative evaluation values are different from each other even when the lesion progresses to the same extent in the entrance side portion of the tubular elongated organ and the back side portion in the depth direction, and there may be a disadvantage that the value of the severity changes.

Therefore, in the processor for an endoscope according to one embodiment, when the value of the severity of the lesion is calculated from the plurality of representative evaluation values, calculation processing of the severity adjusted according to the information on the imaging position corresponding to the evaluation target image is set and calculation is performed. That is, the value of the severity is adjusted according to the information on the imaging position. As a result, it is possible to stably and accurately evaluate the degree of lesion progression regardless of the imaging position of the evaluation target image.

Figure 12:
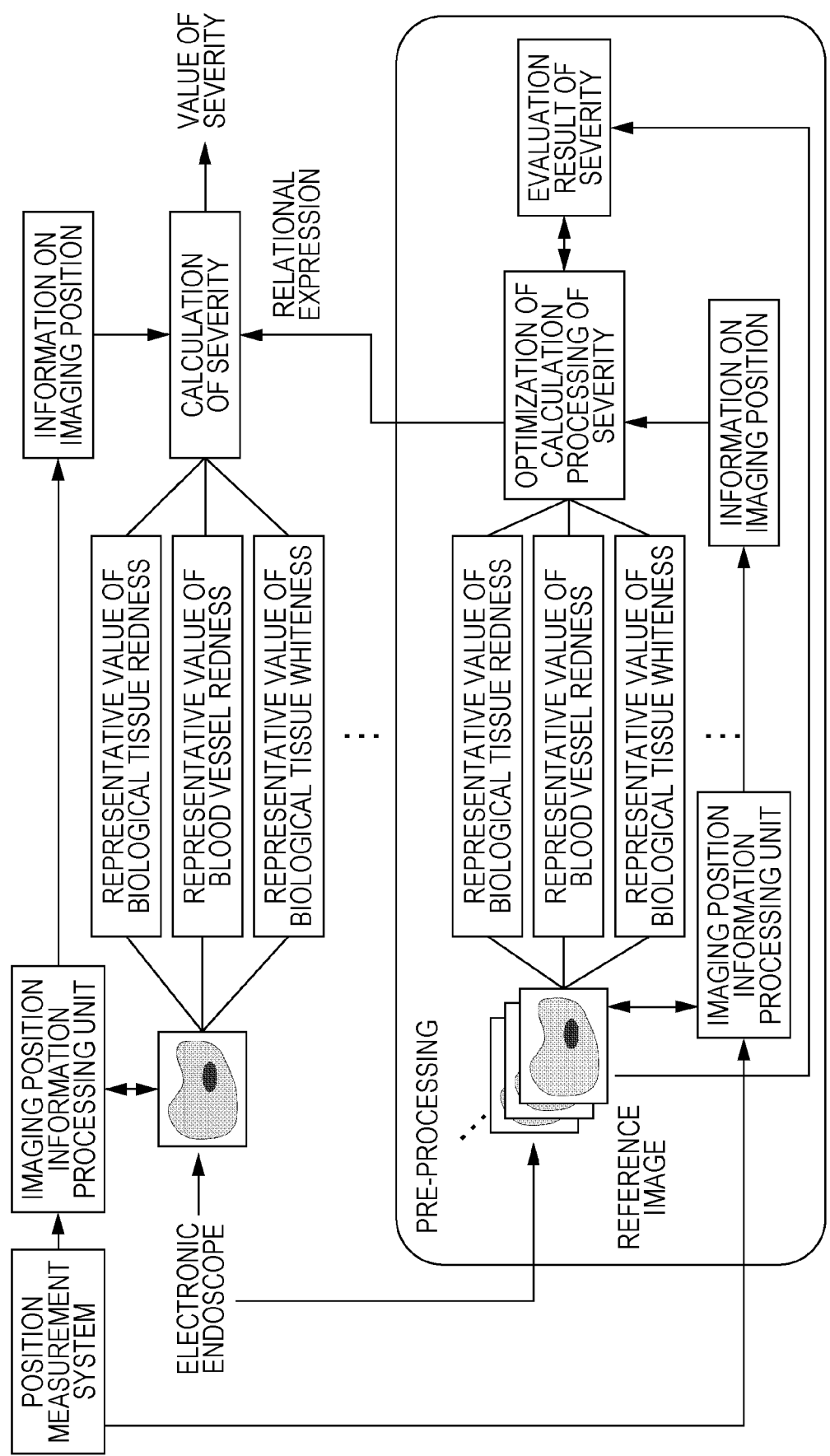
FIG. 12 is a diagram illustrating an example of severity calculation processing performed by the processor for an endoscope according to one embodiment.

FIG. 12 is a diagram illustrating an example of processing performed by the processor for an endoscope and the endoscope system according to one embodiment. In the example illustrated in FIG. 12, the plurality of representative evaluation values include at least the representative value of the biological tissue redness indicating the degree of inflammation of the biological tissue, the representative value of the blood vessel redness indicating the degree of red in the blood vessel region, and the representative value of the biological tissue whiteness indicating the degree of ulcer. A method of calculating these representative evaluation values will be described later.

First, as pre-processing, a plurality of reference images which is captured by an electronic endoscope and for which the evaluation result of the degree of progression (severity) of the lesion is determined are prepared, and the plurality of representative evaluation values are calculated in advance in each of these reference images. The evaluation regarding the severity is, for example, a subjective evaluation result (for example, MAYO endoscopic subscore) by a doctor or a histological evaluation result. The calculation processing of the severity is optimized using the plurality of representative evaluation values such that the severity calculated by combining the plurality of representative evaluation values including these three representative evaluation values best correlates with the evaluation result of the degree of progression (severity) of the lesion determined in each reference image. In this case, the optimization of the calculation processing of the severity is performed for each imaging position using the information on the imaging position of the reference image.

The optimization of the calculation of the severity includes, for example, setting a value of a coefficient related to each representative evaluation value in the relational expression according to the imaging position, calculating a value of the severity using a representative evaluation value (normalized evaluation value) normalized by two reference values related to the representative evaluation value according to the imaging position as information on the representative evaluation value input to the relational expression, or using a value obtained by normalizing a calculation result of the severity calculated using the relational expression by two reference values related to the severity set according to the imaging position as the value of the severity. The measurement processing content in which the severity is optimized using the relational expression thus obtained is set before the calculation of the severity in the evaluation target image in the processor for an endoscope.

Next, a plurality of representative evaluation values including the representative value of the biological tissue redness, the representative value of the blood vessel redness, and the representative value of the biological tissue whiteness obtained from the image obtained by imaging the biological tissue with the electronic endoscope are calculated, and the severity is calculated by inputting the plurality of calculated representative evaluation values to the relational expression. In this case, according to the optimized calculation processing content of the severity, for example, the value of the coefficient related to each representative evaluation value in the relational expression is set according to the imaging position, and the value of the severity is calculated using the calculation formula. Alternatively, as the information on the representative evaluation value input to the relational expression that does not change depending on the imaging position, the value of the severity is calculated using the representative evaluation value (normalized evaluation value) normalized by two reference values related to the representative evaluation value according to the imaging position. Alternatively, after calculating the severity using the relational expression that does not change depending on the imaging position, the value of the calculation result is normalized by two reference values set according to the imaging position to be the value of the severity.

As described above, when the value of the severity of the lesion is calculated from the plurality of representative evaluation values in the evaluation target image, the calculation is performed by setting the calculation processing of the severity adjusted according to the information on the imaging position of the evaluation target image. Therefore, the degree of progression of the lesion can be stably and accurately evaluated regardless of the imaging position of the image.

Figure 13:
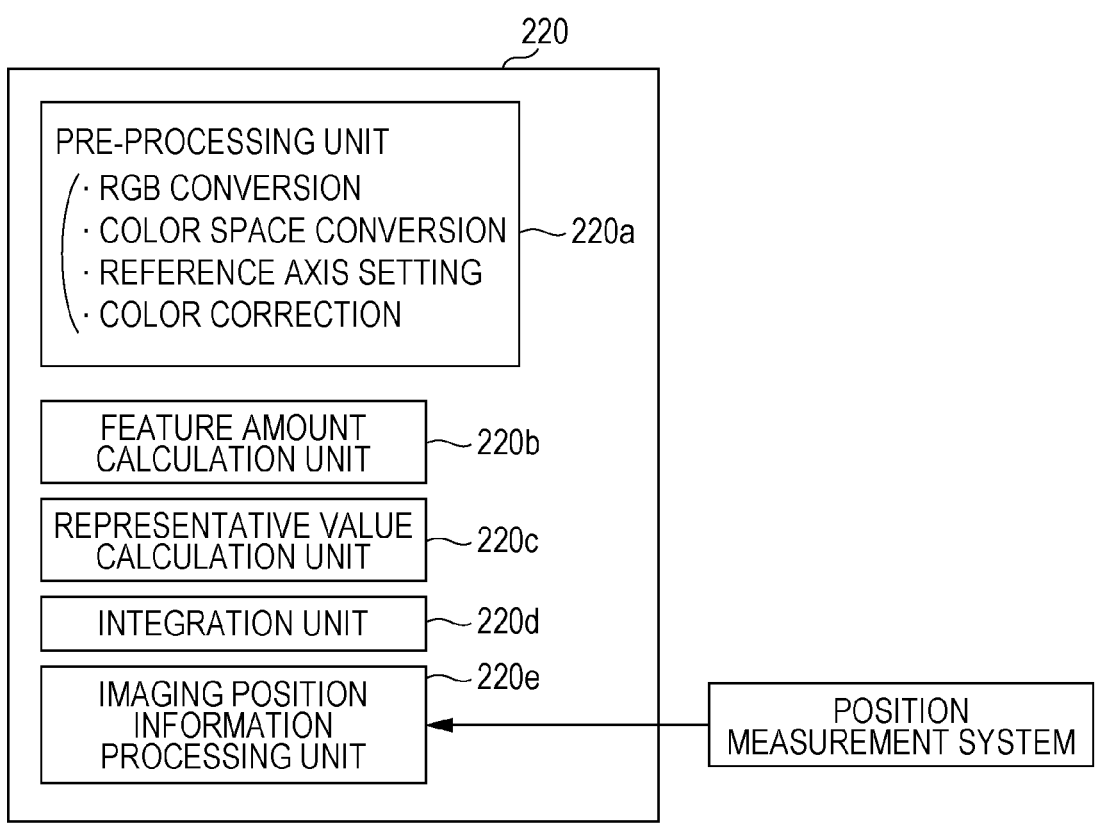
FIG. 13 is a diagram illustrating a configuration of the image processing unit that calculates the severity in the processor for an endoscope according to one embodiment.

FIG. 13 is a diagram for describing a configuration of the image processing unit 220 that performs numerical processing of quantifying the degree of the feature of the lesion in order to calculate the severity of the lesion of the biological tissue.

The image processing unit 220 is a unit that obtains the severity of the lesion obtained by quantifying the degree of progression of the lesion of the biological tissue from the image of the biological tissue obtained by the electronic endoscope 100. The image processing unit 220 includes the preprocessing unit 220a, the feature amount calculation unit 220b, the representative value calculation unit 220c, the integration unit 220d, and an imaging position information processing unit 220e.

The preprocessing unit 220a, the feature amount calculation unit 220b, and the representative value calculation unit 220c have already been described with reference to FIG. 3, and thus redundant description will be omitted.

The integration unit 220d calculates the value of the severity of the lesion by integrating the representative value of the biological tissue redness and the representative value of the blood vessel redness. In this case, the integration unit 220d sets the calculation processing of the severity adjusted according to the information on the imaging position of the captured image.

The information on the imaging position is associated with the captured image in the imaging position information processing unit 220e. The information on the imaging position is transmitted from, for example, a position measurement system provided in the endoscope system 1 to the imaging position information processing unit 220e.

Examples of the position measurement system include a system that uses a sensor to acquire the position of the solid-state imaging element 108 located at the distal end portion of the electronic endoscope inserted into the organ, and further each position of the subsequent flexible tube, a system that acquires an insertion length of an electronic scope 100 inserted from the open end of the organ, and a system that displays a captured image on the monitor 300 and acquires a specific portion passage signal indicating that a distal end portion of the electronic scope 100 has passed through a feature portion in the inserted organ by a manual input instruction of an operator who looks at the image.

In a system that acquires the position of the solid-state imaging element 108 using a sensor, for example, a plurality of magnetic sensors is provided at predetermined intervals in a position in the vicinity of the solid-state imaging element 108 at the distal end portion of the electronic endoscope 100 and a flexible tube following the processor 200 side from the distal end portion, a magnetic field having different strength depending on the position is applied from the outside of a human body in which the electronic endoscope 100 is inserted into an organ, and the magnetic sensor measures the strength of the magnetic field, whereby the position of the magnetic sensor provided at the distal end portion can be known, and further, a curved shape of the flexible tube in the organ can be known from the positions of the plurality of magnetic sensors. As a result, the position of the distal end portion of the solid-state imaging element 108 can be known, and the shape in the organ of the electronic endoscope 100 and the insertion length from the open end of the organ of the electronic endoscope 100 can be known.

In the case of a system that acquires the insertion length of the electronic endoscope 100 inserted from the opening end of the organ, for example, it is possible to acquire information on the current insertion length of the electronic endoscope 100 by acquiring movement distance information regarding how much the biological tissue has moved between adjacent frame images in a captured moving image using optical flow processing, and integrating the movement distance information every time the frame image changes to calculate the movement distance. Furthermore, for example, by measuring the length of the flexible tube following the distal end portion of the electronic endoscope 100 to be inserted, which is unwound toward the inside of the organ, the information on the current insertion length of the electronic endoscope 100 can be acquired.

In the system that acquires the specific portion passage signal of the organ, while the operator sees the image displayed on the monitor 300, the operator presses the button at hand to generates the specific portion passage signal at a time point when an identifiable specific portion inside the organ appears in the image and passes through, and imaging position information processing unit 220e can acquire this specific portion passage signal. The positions of specific portions inside the organ are, for example, when the organ is the large intestine, a position where an ascending colon begins, a position where the ascending colon ends and the large intestine bends and a transverse colon begins, and a position where the transverse colon ends, the large intestine bends, and a descending colon starts, a position where the descending colon ends, the large intestine bends, and the sigmoid colon begins, a position where the sigmoid colon ends and the rectum begins, and a position where the rectum ends and reaches the anus.

The integration unit 220d sets the calculation processing content of the severity according to the information on the imaging position obtained in this manner and associated with the image. In a case where the integration unit 220d calculates the value of the severity according to the relational expression in which the severity is associated with the representative evaluation value of each of the plurality of features, according to one embodiment, a value corresponding to the information on the imaging position is set to the coefficient related to the representative evaluation value in the relational expression. With regard to such coefficients, the values of the coefficients of the relational expression are calculated for each imaging position by the pre-processing illustrated in FIG. 12 so that the correlation between the numerical value of the evaluation result of the degree of progression (severity) of the lesion in the reference image and the calculation results of the plurality of severity levels becomes the highest, and are held in the memory 204. As a result, it is possible to suppress the degree to which the value of the severity changes depending on the information on the imaging position.

Therefore, the integration unit 220d reads the value of the coefficient corresponding to the information on the imaging position from the memory 204, and gives the value of the coefficient to the relational expression.

According to one embodiment, the memory 204 holds, for each imaging position, two reference values related to a representative evaluation value set based on the plurality of reference images (see FIG. 12) obtained by imaging the plurality of lesion parts having different degrees of lesion progression with the electronic endoscope, as values determined according to information on the imaging position of the reference image. In this case, the integration unit 220d calculates the severity in the evaluation target image captured by the electronic endoscope 100 using the relational expression in which the normalized evaluation value obtained by normalizing the representative evaluation value of the reference image by the two reference values according to the information on the imaging position of the reference image captured by the electronic endoscope 100 and the severity are associated in advance.

Examples of the two reference values include a representative evaluation value indicated by the healthy part of the biological tissue and a representative evaluation value indicated by the lesion part when the lesion of the lesion part has progressed most. The two reference values are preferably an upper limit value and a lower limit value that the representative evaluation value of the reference image can take at the imaging position. This reference value is acquired for each imaging position together with the relational expression by optimizing the calculation processing of the severity of the pre-processing. Therefore, in the pre-processing, a relational expression associating the normalized evaluation value obtained by normalizing the representative evaluation value with the severity is extracted by the two reference values.

When calculating the severity from the evaluation target image captured by the electronic endoscope 100, the integration unit 220d reads two reference values according to the information on the imaging position of the evaluation target image from the memory 204, and calculates the value of the severity by inputting the normalized evaluation value to the above-described relational expression associating the severity with the normalized evaluation value obtained by normalizing the representative evaluation value by the two reference values. As a result, it is possible to suppress a change in the value of the severity depending on the imaging position. Note that, in a case where the degree to which the value of the severity changes depending on the imaging position is still large, in addition to using the normalized evaluation value for the relational expression, the value of the coefficient used in the relational expression in which the normalized evaluation value and the severity are associated with each other may also be set according to the imaging position.

According to one embodiment, the memory 204 holds two reference values regarding the severity set based on a plurality of reference images (see FIG. 12) obtained by imaging a plurality of lesion parts having different degrees of lesion progression with the electronic endoscope 100 as values determined according to the imaging position of the reference image, for each imaging position of the electronic endoscope 100. The integration unit 220d calculates the severity using a relational expression in which the representative evaluation value of the evaluation target image captured by the electronic endoscope 100 and the severity are associated in advance, and calculates, as the value of the severity, a normalized value obtained by normalizing the value of the calculation result with two reference values determined in correspondence with the information on the imaging position of the evaluation target image.

Here, as the two reference values, for example, a value before normalization of the severity indicated by the healthy part of the biological tissue and a value before normalization of the severity indicated by the lesion part when the lesion of the lesion part has progressed the most are exemplified. The two reference values are preferably an upper limit value and a lower limit value that can be taken by the value (value before normalization) of the severity of the reference image at the imaging position. This reference value is acquired for each imaging position together with the relational expression by optimizing the calculation processing of the severity of the pre-processing. Therefore, in the pre-processing, a relational expression in which the two reference values, the representative evaluation value, and the severity are associated with each other is extracted.

Therefore, the integration unit 220d calculates the representative evaluation value of the evaluation target image by inputting the representative evaluation value to the relational expression in which the severity is associated with the representative evaluation value of each of the plurality of features, and calculates, as the value of the severity, a normalized value obtained by normalizing the value of the calculation result with two reference values read from the memory 204 according to the imaging position. As a result, the degree to which the value of the severity changes depending on the imaging position can be suppressed. Note that, in a case where the degree of change in the value of the severity depending on the imaging position is still large, in addition to using the normalized value as the value of the severity, the coefficient used for the relational expression may be set to a value corresponding to the information on the imaging position, and further, a configuration using a relational expression in which the normalized evaluation value obtained by normalizing the representative evaluation value and the severity are associated with each other may be adopted.

According to one embodiment, the above-described relational expression is preferably a regression equation of a polynomial extracted by performing multiple regression analysis such that a value of severity calculated from a representative evaluation value of each of a plurality of features corresponds to the evaluation result of a degree of progression of a lesion of the reference image which is prepared in advance and for which the evaluation result regarding severity is determined. Such a regression equation is calculated in the optimization of the calculation processing of the severity in the pre-processing. By using the regression equation, the calculation result of the severity can correspond to the evaluation result of the severity with a high correlation.

Furthermore, according to one embodiment, the information on the imaging position is preferably position information on one section when the region in the depth direction of the tubular organ is divided into a plurality of sections. In the tubular organ, since there is a portion in which the form of the surface of the biological tissue is different between the entrance portion and the depth side portion of the organ, the value of the severity is different according to the information on the imaging position even in the same healthy part, and the degree of change in the value becomes large. Therefore, it is particularly preferable to set the content of the calculation processing of the severity according to the information on the imaging position in a case where a tubular organ is to be examined. When the organ is, for example, a large intestine including a rectum, a sigmoid colon, a descending colon, a transverse colon, and an ascending colon, the organ may be divided into two sections of a section from the rectum to the sigmoid colon of the large intestine and a section from the sigmoid colon to the ascending colon on the back side of the sigmoid colon, or may be divided into five sections of the rectum, the sigmoid colon, the descending colon, the transverse colon, and the ascending colon.

Figure 14:
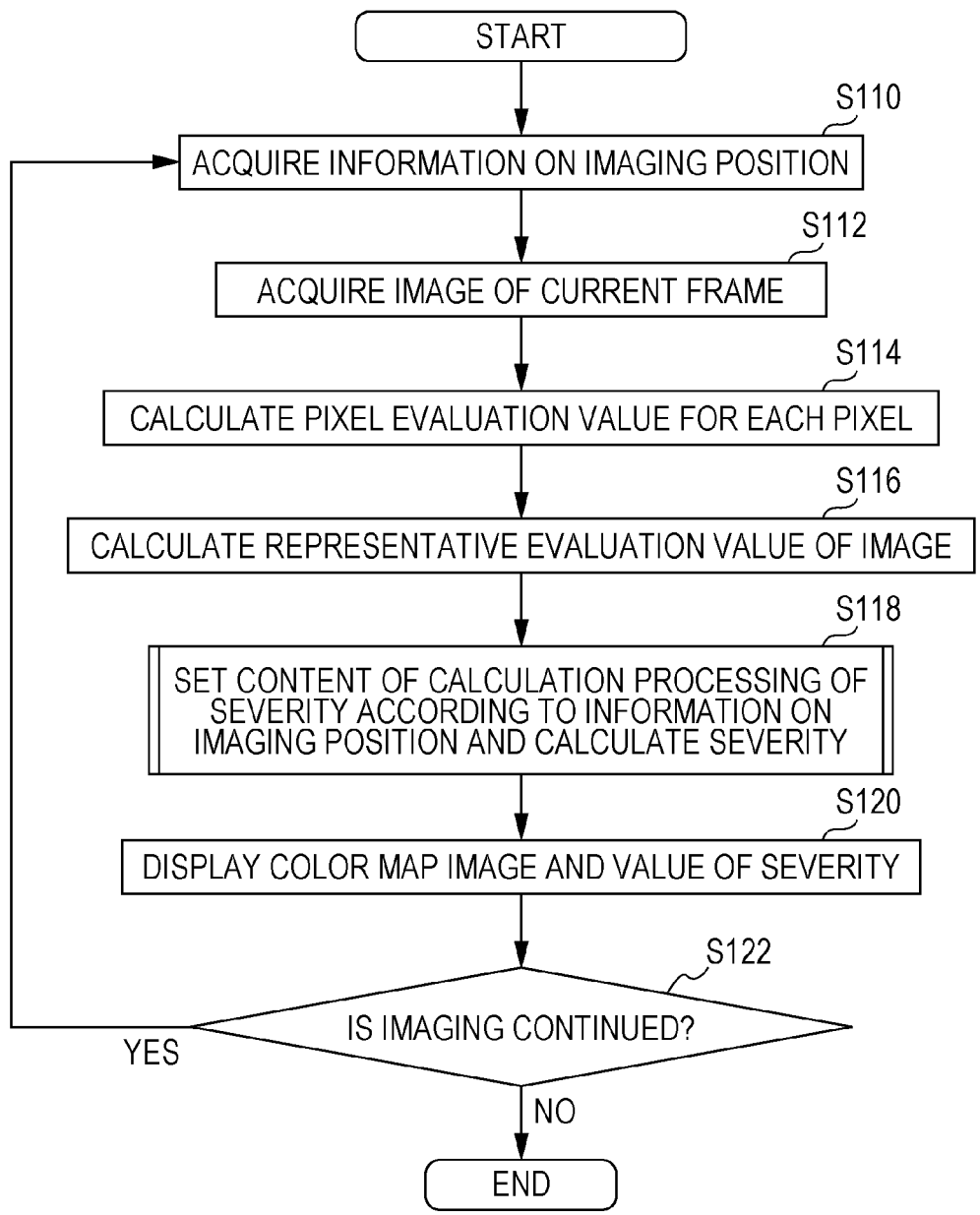
FIG. 14 is a diagram illustrating an example of a flow of a method of calculating the severity performed by the processor for an endoscope according to one embodiment.

FIG. 14 is a diagram illustrating an example of a flow of a method of calculating severity performed by the endoscope system according to one embodiment.

First, imaging is performed to obtain the evaluation target image by the electronic endoscope 100, and the information on the imaging position in this case is associated with the evaluation target image and acquired by a position information acquisition unit in the processor for an endoscope (Step S110). Meanwhile, after the captured image is processed by the driver signal processing circuit 112, the image processing unit 220 acquires the image of the current frame through the system controller 202 (Step S112).

Next, the preprocessing unit 220a performs preprocessing including the above-described RGB conversion, color space conversion, setting of the reference axis, and color correction, and tone enhancement processing as necessary, and further, the feature amount calculation unit 220b calculates, for each pixel, a plurality of pixel evaluation values indicating the degree of each of a plurality of features related to the color component or the shape indicated by the lesion part, for example, biological tissue redness, blood vessel redness, biological tissue whiteness, and the like, for the preprocessed image (Step S114).

The feature amount calculation unit 220b repeats the processing until the pixel evaluation value is calculated for all the pixels of the image of the current frame. Thereafter, the representative value calculation unit 220c calculates a representative value obtained by integrating the pixel evaluation values, that is, the representative evaluation value (Step S116). The representative value is calculated for each type of pixel evaluation value. In the above-described example, the representative evaluation value is the representative value such as the biological tissue redness, the blood vessel redness, or the biological tissue whiteness.

Figure 15A:
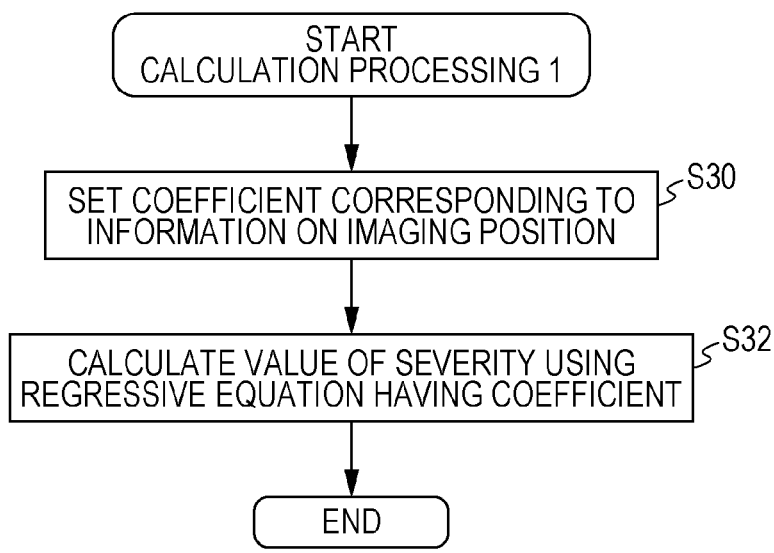
FIG. 15A is a diagram illustrating an example of a flow of the method of calculating the severity performed by the processor for an endoscope according to one embodiment.
Figure 15B:
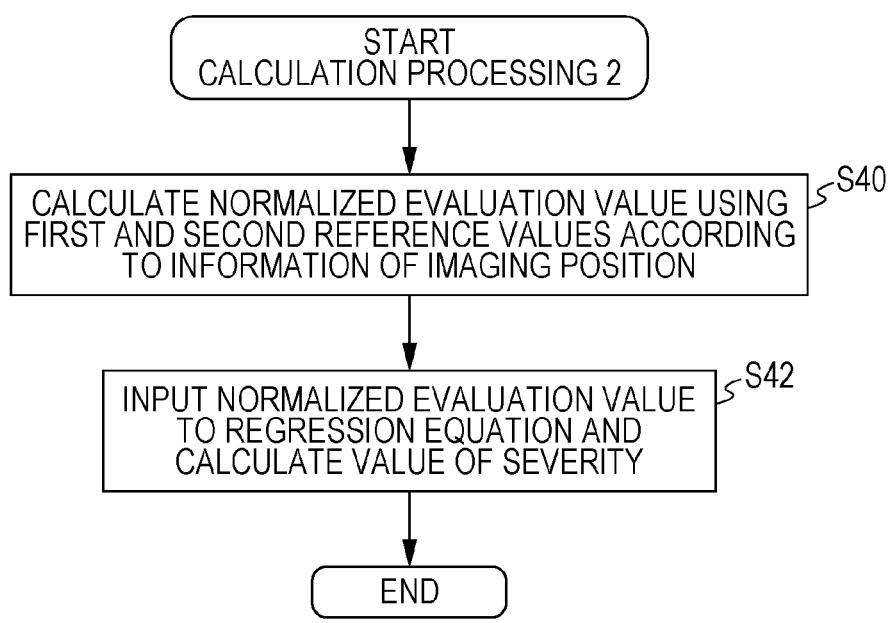
FIG. 15B is a diagram illustrating an example of a flow of the method of calculating the severity performed by the processor for an endoscope according to one embodiment.

The integration unit 220d sets the contents of the calculation processing of the severity according to the information on the imaging position acquired in Step S110, and calculates the severity (Step S118). FIGS. 15A to 15C are diagrams illustrating an example of a flow of calculation processing contents of severity.

FIG. 15A illustrates an example of a flow of the calculation processing 1. In the calculation processing 1, the integration unit 220d sets the value of the coefficient related to each representative evaluation value in the relational expression corresponding to the information on the imaging position (Step S30). Such a value of the coefficient is obtained by calculating the value of each coefficient of the relational expression by the pre-processing illustrated in FIG. 12 so that the value of the severity most corresponds to the evaluation result of the severity, and storing the value in the memory 204. Therefore, when the information on the imaging position is acquired, the value of the coefficient corresponding to the information on the imaging position is read from the memory 204.

Furthermore, the integration unit 220d gives the value of the set coefficient to the coefficient of the regression equation, and calculates the value of the severity by inputting the representative evaluation value to the regression equation (Step S32). Since the value of the coefficient corresponds to the information on the imaging position, it is possible to suppress a change in the value of the severity depending on the imaging position. Therefore, regardless of the imaging position of the image, the degree of progression of the lesion can be stably and accurately evaluated with the value of the severity.

FIG. 15B illustrates an example of a flow of the calculation processing 2. In the calculation processing 2, the integration unit 220d determines two reference values (first reference value, second reference value) according to the information on the imaging position of the evaluation target image, and calculates the normalized evaluation value obtained by normalizing the representative evaluation value using the two reference values (Step S40). For example, when the first reference value is X1, the second reference value is X2 (>X1), and the representative evaluation value is P, (P−X1)/(X2−X1) is satisfied. P does not need to be a value between X1 and X2, but when P is a value between X1 and X2, (P−X1)/(X2−X1) is a value of 0 to 1.

Next, the integration unit 220*d* inputs the normalized evaluation value to the regression equation in which the normalized evaluation value is represented as the explanatory variable, and calculates the value of the severity (Step S42). The regression equation is a relational expression obtained by optimizing the calculation of the severity using the normalized evaluation value of the reference image by the pre-processing, and two reference values (first reference value, second reference value) are calculated for each piece of information on the imaging position by this optimization and stored in the memory 204. Since the two reference values correspond to the information on the imaging position, and the normalized evaluation value is normalized such that the value does not change depending on the imaging position, it is possible to suppress the change in the value of the severity depending on the imaging position. Therefore, regardless of the imaging position of the evaluation target image, the degree of progression of the lesion can be stably and accurately evaluated with the value of the severity.

FIG. 15C illustrates an example of a flow of the calculation processing 3. In the calculation processing 3, the integration unit 220*d* sets two reference values (third reference value, fourth reference value) regarding the severity according to the information on the imaging position of the evaluation target image (Step S50).

Next, the integration unit 220*d* inputs the representative evaluation value calculated in Step S116 to the regression equation to calculate the severity (Step S52).

The integration unit 220*d* normalizes the calculation result of the severity with two reference values, and calculates the normalized value of the severity as the value of the severity (Step S54). For example, when the third reference value is X3, the fourth reference value is X4, and the calculation result of the severity is Q, (Q−X3)/(X4−X3) is satisfied. Q need not be a value between X3 and X4, but when Q is a value between X3 and X4, (Q−X3)/(X4−X3) is a value of 0 to 1. The two reference values correspond to the information on the imaging position, and the normalized value of the severity is normalized such that the value does not change depending on the imaging position. Therefore, it is possible to suppress the change in the value of the severity depending on the imaging position. Therefore, regardless of the imaging position of the image, the degree of progression of the lesion can be stably and accurately evaluated with the value of the severity.

After the value of the severity is obtained in this manner, the processing returns to Step S120 in FIG. 14, and the image processing unit 220 performs control to display the above-described color map image created from the pixel evaluation value in the feature amount calculation unit 220*b* and the value of the severity obtained in Step S118 on the display screen of the monitor 300.

In this way, the image processing unit 220 determines whether or not to continuously perform imaging for obtaining the evaluation target image, and in a case where imaging is continued, the processing returns to Step S110 and the above-described processing is repeated. In a case where imaging is not continued, the above-described processing ends.

Since the value of the severity calculated in this manner is displayed on the screen of the monitor 300, the user can know the degree of progression of the lesion by viewing the monitor 300.

The endoscope system of the present invention is described above in detail, but the endoscope system of the present invention is not limited to the above-described embodiment, and may of course be modified or altered in various ways in a range not deviating from the scope and spirit of the present invention.

The present invention relates to a patent application of Japanese Patent Application No. 2020-160703 filed with the Japanese Patent Office on Sep. 25, 2020 and a patent application of Japanese Patent Application No. 2020-161900 filed with the Japanese Patent Office on Sep. 28, 2020, the entire contents of which are incorporated herein by reference.

The invention claimed is:

1. A processor for an endoscope, comprising:
an image processing unit configured to obtain a severity of a lesion representing a degree of progression of a lesion of a biological tissue by one value from an image of a lesion part of the biological tissue obtained by an electronic endoscope configured to image the biological tissue in a body cavity, using at least information on the image, wherein the image processing unit includes
a feature amount calculation unit configured to calculate, for each pixel from the image, a first pixel evaluation value indicating a degree of a first feature of the appearance of the lesion including a first color component of the lesion part or a shape of the lesion part, the first pixel evaluation value being a pixel evaluation value corresponding to the first feature and being capable of distinguishing the first feature of the appearance of the lesion part from a feature of a healthy part of the biological tissue by the first color component or the shape of the lesion part,
a representative value calculation unit configured to calculate a first representative evaluation value of the first feature of the biological tissue by collecting the first pixel evaluation values of the respective pixels in the image, and
an integration unit configured to calculate the severity of the lesion based on at least the first representative evaluation value by adjusting a degree of influence of the first representative evaluation value, indicating a change in the severity of the lesion corresponding to a change in the first representative evaluation value based on at least information on a second color component of the image different from the first color component or based on at least a second representative evaluation value obtained by collecting second pixel evaluation values indicating a degree of a second feature different from the first feature,
wherein when the first representative evaluation value is X and the second representative evaluation value is Y, the integration unit performs a calculation according to the severity of the lesion=$\alpha_1 \cdot X + \beta_1 \cdot Y + \gamma_1 \cdot X \cdot Y + d_1$ using coefficients $\alpha_1$, $\beta_1$, and $\gamma_1$ and a constant $d_1$, wherein each of the coefficients is a weighting coefficient and is non-zero.

2. The processor for an endoscope according to claim 1, wherein the severity of the lesion is calculated according to a polynomial having at least the first representative evaluation value as an explanatory variable, and
the degree of influence is a coefficient related to the first representative evaluation value of the polynomial.

3. The processor for an endoscope according to claim 2, wherein the polynomial is a regression equation regarding the severity of the lesion obtained by performing multiple regression analyses in advance using a reference image in which an evaluation value is determined as an evaluation result of a degree of progression of the lesion, using the first pixel evaluation value and a value indicating information on the second color component or the second pixel evaluation value as explanatory variables, using the evaluation value in the reference image as a value of the severity of the lesion, and using the value of the severity of the lesion as an objective variable.

4. The processor for an endoscope according to claim 1, wherein the influence degree of the first representative evaluation value is adjusted using at least a third representative evaluation value obtained by collecting third pixel evaluation values indicating a degree of a third feature different from the first feature and the second feature in addition to the second representative evaluation value or the information on the second color component.

5. The processor for an endoscope according to claim 1, wherein each of the first feature and the second feature is a degree of a color component exhibited by an inflamed part of the biological tissue, a degree of a color component exhibited by a blood vessel region indicating a blood vessel extending in a streak shape in the biological tissue, or a degree of a color component exhibited by an ulcerated part of the biological tissue.

6. The processor for an endoscope according to claim 1, wherein the first representative evaluation value is a total number of bins having a frequency of 1 or more in a histogram of the first pixel evaluation value in the image of the lesion part of the biological tissue.

7. The processor for an endoscope according to claim 6, wherein the first representative evaluation value is a value indicating a degree of a color component exhibited by an inflamed part of the biological tissue.

8. The processor for an endoscope according to claim 1, wherein the information on the second color component is a feature amount related to a color component exhibited by a residue that is introduced into the body cavity from the outside and is on the biological tissue.

9. A processor for an endoscope, comprising:
an image processing unit configured to obtain a severity of a lesion representing a degree of progression of a lesion of a biological tissue by one value from an image of a lesion part of the biological tissue obtained by an electronic endoscope configured to image the biological tissue in a body cavity, using at least information on the image, wherein the image processing unit includes
a feature amount calculation unit configured to calculate, for each pixel from the image, a first pixel evaluation value indicating a degree of a first feature of the appearance of the lesion including a first color component of the lesion part or a shape of the lesion part, the first pixel evaluation value being a pixel evaluation value corresponding to the first feature and being capable of distinguishing the first feature of the appearance of the lesion part from a feature of a healthy part of the biological tissue by the first color component or the shape of the lesion part,
a representative value calculation unit configured to calculate a first representative evaluation value of the first feature of the biological tissue by collecting the first pixel evaluation values of the respective pixels in the image, and
an integration unit configured to calculate the severity of the lesion based on at least the first representative evaluation value by adjusting a degree of influence of the first representative evaluation value, indicating a change in the severity of the lesion corresponding to a change in the first representative evaluation value based on at least information on a second color component of the image different from the first color component or based on at least a second representative evaluation value obtained by collecting second pixel evaluation values indicating a degree of a second feature different from the first feature,
wherein when the first representative evaluation value is X and a value indicating information on the second color component is Z, the integration unit performs calculation according to the severity of the $\alpha_2 \cdot X + \beta_2 \cdot X \cdot Z + d_2$ using coefficients $\alpha_2$ and $\beta_2$ and a constant $d_2$, wherein each of the coefficients is a weighting coefficient and is non-zero.

10. An endoscope system comprising:
an electronic endoscope configured to image biological tissue in a body cavity; and
the processor for an endoscope according to claim 1, connected to the electronic endoscope.

* * * * *